(12) United States Patent
Adjakple et al.

(10) Patent No.: US 9,743,446 B2
(45) Date of Patent: Aug. 22, 2017

(54) METHOD AND APPARATUS FOR MULTI-RAT ACCESS MODE OPERATION

(75) Inventors: Pascal M. Adjakple, Great Neck, NY (US); Ulises Olvera-Hernandez, Kirkland (CA); Peter S. Wang, E. Setauket, NY (US); Kai Liu, S. Huntington, NY (US); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 553 days.

(21) Appl. No.: 13/547,885

(22) Filed: Jul. 12, 2012

(65) Prior Publication Data

US 2013/0016696 A1    Jan. 17, 2013

Related U.S. Application Data

(60) Provisional application No. 61/506,691, filed on Jul. 12, 2011.

(51) Int. Cl.
*H04W 4/00* (2009.01)
*H04W 76/02* (2009.01)
*H04W 88/06* (2009.01)

(52) U.S. Cl.
CPC .......... *H04W 76/025* (2013.01); *H04W 88/06* (2013.01)

(58) Field of Classification Search
USPC .......... 370/319–321, 331, 337, 347
See application file for complete search history.

(56) References Cited

U.S. PATENT DOCUMENTS 8,509,843 B2    8/2013 Takahashi et al.
8,566,455 B1    10/2013 Zhao et al.
(Continued)

FOREIGN PATENT DOCUMENTS

CN    101500281 A    8/2009
CN    101600190 A    12/2009
(Continued)

OTHER PUBLICATIONS

Ericsson et al., "Spectrum Migration From HSPA to LTE," R1-111089, 3GPP TSG-RAN WG1 Meeting #64, Taipei, Taiwan, Feb. 21-25, 2011.
(Continued)

*Primary Examiner* — Frank Duong
(74) *Attorney, Agent, or Firm* — Volpe and Koenig, P.C.

(57) ABSTRACT

A method and apparatus for multiple radio access technology (multi-RAT) access mode operation for a wireless transmit/receive unit (WTRU) are disclosed. A WTRU and a network may enable a multi-RAT access mode of operation based on at least one of WTRU subscription, a service agreement of the WTRU, a roaming status of the WTRU, a selected access point name (APN), an Internet protocol (IP) flow class, a subscriber profile identity for the WTRU, requested quality of service, or a proximity indication indicating proximity to a cell supporting multi-RAT access mode. The WTRU may send a capability indication of support of multi-RAT access to a network, wherein the multi-RAT access mode is enabled based on the capability indication. A partial handover of bearers may be performed. In performing the handover, the target cell is determined based on a priority rule.

16 Claims, 10 Drawing Sheets

(56) References Cited

U.S. PATENT DOCUMENTS

| | | | |
|---|---|---|---|
| 8,718,653 B2 | 5/2014 | Hu et al. | |
| 2002/0024937 A1 | 2/2002 | Barnard et al. | |
| 2002/0086670 A1 | 7/2002 | Rajaniemi | |
| 2007/0207806 A1 | 9/2007 | Shaheen | |
| 2007/0254666 A1 | 11/2007 | De Jong et al. | |
| 2009/0232019 A1 | 9/2009 | Gupta et al. | |
| 2009/0232097 A1 | 9/2009 | Taneja | |
| 2010/0041384 A1* | 2/2010 | Kazmi | 455/419 |
| 2010/0112980 A1* | 5/2010 | Horn et al. | 455/411 |
| 2010/0159919 A1 | 6/2010 | Wu | |
| 2010/0234042 A1 | 9/2010 | Chan et al. | |
| 2010/0329243 A1 | 12/2010 | Buckley et al. | |
| 2011/0021195 A1 | 1/2011 | Cormier et al. | |
| 2011/0075605 A1* | 3/2011 | De Pasquale | H04B 7/022 370/328 |
| 2011/0113157 A1 | 5/2011 | Kim et al. | |
| 2011/0165875 A1 | 7/2011 | Wu | |
| 2011/0170517 A1* | 7/2011 | Bakker et al. | 370/331 |
| 2011/0183670 A1 | 7/2011 | Wu | |
| 2011/0250910 A1 | 10/2011 | Lee et al. | |
| 2011/0310850 A1* | 12/2011 | Klingenbrunn et al. | 370/332 |
| 2012/0033563 A1 | 2/2012 | Jazra et al. | |
| 2012/0071168 A1* | 3/2012 | Tomici | H04W 76/025 455/445 |
| 2012/0127974 A1* | 5/2012 | Doppler et al. | 370/338 |
| 2012/0140743 A1 | 6/2012 | Pelletier et al. | |
| 2012/0218971 A1 | 8/2012 | Chilla et al. | |
| 2012/0257598 A1* | 10/2012 | Karampatsis et al. | 370/331 |
| 2012/0314688 A1* | 12/2012 | Taleb et al. | 370/331 |
| 2013/0028069 A1 | 1/2013 | Pelletier et al. | |
| 2013/0070656 A1 | 3/2013 | Chin et al. | |
| 2013/0137423 A1 | 5/2013 | Das et al. | |
| 2013/0143542 A1 | 6/2013 | Kovvali et al. | |
| 2013/0288686 A1 | 10/2013 | Chou | |
| 2014/0161002 A1 | 6/2014 | Gauvreau et al. | |
| 2014/0161026 A1* | 6/2014 | Stojanovski et al. | 370/328 |
| 2014/0161055 A1* | 6/2014 | Chitrapu | H04W 48/18 370/329 |

FOREIGN PATENT DOCUMENTS

| | | |
|---|---|---|
| JP | 2010-109954 A2 | 5/2010 |
| WO | 2008/085908 | 7/2008 |
| WO | 2010051873 A1 | 5/2010 |
| WO | 2010/092049 | 8/2010 |
| WO | 2010/092457 | 8/2010 |
| WO | 2011/069092 A1 | 6/2011 |
| WO | 2011/069096 | 6/2011 |
| WO | 2011072747 A1 | 6/2011 |

OTHER PUBLICATIONS

Ericsson, "Impact of Carrier Aggregation on the L2 protocol architecture for LTE Rel-10," 3GPP TSG-RAN WG2 #66, R2-092957 (May 4-8, 2009).
Huawei et al., "Migration Scenarios and Possible Aggregation Between HSPA and LTE," R1-111126, 3GPP TSG RAN WG1 #64, Taipei, Taiwan, Feb. 21-25, 2011.
LG Electronics et al., "WID for Operator Policies for IP Interface Selection (OPIIS)," TD S2-110668, 3GPP TSG SA WG2 Meeting #83, Salt Lake City, Utah, USA, Feb. 21-25, 2011.
Nokia Siemens Networks et al., "Aggregating HSDPA and LTE Carriers," R1-111060, 3GPP TSG-RAN WG1 Meeting #64, Taipei, Taiwan, Feb. 21-25, 2011.
Teliasonera, "Equivalent PLMN Issues," SP-110391, 3GPP TSG-SA Meeting #52, Bratislava, Slovakia, Jun. 6-8, 2011.
Third Generation Partnership Project, "Technical Specification Group Radio Access Network; Radio Resource Control (RRC); Protocol Specification (Release 1999)," 3GPP TS 25.331 v3.21.0, Dec. 2004.
Third Generation Partnership Project, "Technical Specification Group Radio Access Network; Radio Resource Control (RRC); Protocol Specification (Release 4)," 3GPP TS 25.331 v4.20.0, Dec. 2008.
Third Generation Partnership Project, "Technical Specification Group Radio Access Network; Radio Resource Control (RRC); Protocol Specification (Release 4)," 3GPP TS 25.331 v4.21.0, Jan. 2012.
Third Generation Partnership Project, "Technical Specification Group Radio Access Network; Radio Resource Control (RRC); Protocol Specification (Release 5)," 3GPP TS 25.331 v5.24.0, Jun. 2009.
Third Generation Partnership Project, "Technical Specification Group Radio Access Network; Radio Resource Control (RRC); Protocol Specification (Release 5)," 3GPP TS 25.331 v5.25.0, Jan. 2012.
Third Generation Partnership Project, "Technical Specification Group Radio Access Network; Radio Resource Control (RRC); Protocol Specification (Release 6)," 3GPP TS 25.331 v6.25.0, Apr. 2010.
Third Generation Partnership Project, "Technical Specification Group Radio Access Network; Radio Resource Control (RRC); Protocol Specification (Release 6)," 3GPP TS 25.331 v6.26.0, Jan. 2012.
Third Generation Partnership Project, "Technical Specification Group Radio Access Network; Radio Resource Control (RRC); Protocol Specification (Release 7)," 3GPP TS 25.331 v7.20.0, Jun. 2011.
Third Generation Partnership Project, "Technical Specification Group Radio Access Network; Radio Resource Control (RRC); Protocol Specification (Release 7)," 3GPP TS 25.331 v7.22.0, Mar. 2012.
Third Generation Partnership Project, "Technical Specification Group Radio Access Network; Radio Resource Control (RRC); Protocol Specification (Release 8)," 3GPP TS 25.331 v8.15.0, Jun. 2011.
Third Generation Partnership Project, "Technical Specification Group Radio Access Network; Radio Resource Control (RRC); Protocol Specification (Release 8)," 3GPP TS 25.331 v8.19.0, Jul. 2012.
Third Generation Partnership Project, "Technical Specification Group Radio Access Network; Radio Resource Control (RRC); Protocol Specification (Release 9)," 3GPP TS 25.331 v9.7.0, Jul. 2011.
Third Generation Partnership Project, "Technical Specification Group Radio Access Network; Radio Resource Control (RRC); Protocol Specification (Release 9)," 3GPP TS 25.331 v9.11.0, Jul. 2012.
Third Generation Partnership Project, "Technical Specification Group Radio Access Network; Radio Resource Control (RRC); Protocol Specification (Release 10)," 3GPP TS 25.331 v10.4.0, Jul. 2011.
Third Generation Partnership Project, "Technical Specification Group Radio Access Network; Radio Resource Control (RRC); Protocol Specification (Release 10)," 3GPP TS 25.331 v10.8.0, Jul. 2012.
Third Generation Partnership Project, "Technical Specification Group Radio Access Network; Radio Resource Control (RRC); Protocol Specification (Release 11)," 3GPP TS 25.331 v11.2.0, Jul. 2012.
Third Generation Partnership Project, "Technical Specification Group Services and System Aspects; 3G Security; Security Architecture (Release 99)," 3GPP TS 33.102 v3.13.0, Dec. 2002.
Third Generation Partnership Project, "Technical Specification Group Services and System Aspects; 3G Security; Security Architecture (Release 4)," 3GPP TS 33.102 v4.5.0, Dec. 2002.
Third Generation Partnership Project, "Technical Specification Group Services and System Aspects; 3G Security; Security Architecture (Release 5)," 3GPP TS 33.102 v5.7.0, Dec. 2005.
Third Generation Partnership Project, "Technical Specification Group Services and System Aspects; 3G Security; Security Architecture (Release 6)," 3GPP TS 33.102 v6.5.0, Dec. 2005.
Third Generation Partnership Project, "Technical Specification Group Services and System Aspects; 3G Security; Security Architecture (Release 7)," 3GPP TS 33.102 v7.1.0, Dec. 2006.

(56) References Cited

OTHER PUBLICATIONS

Third Generation Partnership Project, "Technical Specification Group Services and System Aspects; 3G Security; Security Architecture (Release 8)," 3Gpp TS 33.102 v8.6.0, Apr. 2010.
Third Generation Partnership Project, "Technical Specification Group Services and System Aspects; 3G Security; Security Architecture (Release 9)," 3GPP TS 33.102 v9.4.0, Dec. 2010.
Third Generation Partnership Project, "Technical Specification Group Services and System Aspects; 3G Security; Security Architecture (Release 10)," 3GPP TS 33.102 v10.0.0, Dec. 2010.
Third Generation Partnership Project, "Technical Specification Group Services and System Aspects; 3G Security; Security Architecture (Release 11)," 3GPP TS 33.102 v11.3.0, Jun. 2012.
Third Generation Partnership Project, "Technical Specification Group Services and System Aspects; General Packet Radio Service (GPRS); Service Description; Stage 2 (Release 99)," 3GPP TS 23.060 v3.17.0, Dec. 2006.
Third Generation Partnership Project, "Technical Specification Group Services and System Aspects; General Packet Radio Service (GPRS); Service Description; Stage 2 (Release 4)," 3GPP TS 23.060 v4.11.0, Dec. 2006.
Third Generation Partnership Project, "Technical Specification Group Services and System Aspects; General Packet Radio Service (GPRS); Service Description; Stage 2 (Release 5)," 3GPP TS 23.060 v5.13.0, Dec. 2006.
Third Generation Partnership Project, "Technical Specification Group Services and System Aspects; General Packet Radio Service (GPRS); Service Description; Stage 2 (Release 6)," 3GPP TS 23.060 v6.15.0, Dec. 2006.
Third Generation Partnership Project, "Technical Specification Group Services and System Aspects; General Packet Radio Service (GPRS); Service Description; Stage 2 (Release 7)," 3GPP TS 23.060 v7.11.0, Jun. 2011.
Third Generation Partnership Project, "Technical Specification Group Services and System Aspects; General Packet Radio Service (GPRS); Service Description; Stage 2 (Release 8)," 3GPP TS 23.060 v8.13.0, Jun. 2011.
Third Generation Partnership Project, "Technical Specification Group Services and System Aspects; General Packet Radio Service (GPRS); Service Description; Stage 2 (Release 8)," 3GPP TS 23.060 v8.15.0, Mar. 2012.
Third Generation Partnership Project, "Technical Specification Group Services and System Aspects; General Packet Radio Service (GPRS); Service Description; Stage 2 (Release 9)," 3GPP TS 23.060 v9.9.0, Jun. 2011.
Third Generation Partnership Project, "Technical Specification Group Services and System Aspects; General Packet Radio Service (GPRS); Service Description; Stage 2 (Release 9)," 3GPP TS 23.060 v9.12.0, Mar. 2012.
Third Generation Partnership Project, "Technical Specification Group Services and System Aspects; General Packet Radio Service (GPRS); Service Description; Stage 2 (Release 10)," 3GPP TS 23.060 v10.4.0, Jun. 2011.
Third Generation Partnership Project, "Technical Specification Group Services and System Aspects; General Packet Radio Service (GPRS); Service Description; Stage 2 (Release 10)," 3GPP TS 23.060 v10.8.1, Jun. 2012.
Third Generation Partnership Project, "Technical Specification Group Services and System Aspects; General Packet Radio Service (GPRS); Service Description; Stage 2 (Release 11)," 3GPP TS 23.060 v11.2.0, Jun. 2012.
Third Generation Partnership Project, "Technical Specification Group Services and System Aspects; General Packet Radio Service (GPRS) Enhancements for Evolved Universal Terrestrial Radio Access Network (E-UTRAN) Access (Release 8)," 3GPP TS 23.401 v8.14.0, Jun. 2011.
Third Generation Partnership Project, "Technical Specification Group Services and System Aspects; General Packet Radio Service (GPRS) Enhancements for Evolved Universal Terrestrial Radio Access Network (E-UTRAN) Access (Release 8)," 3GPP TS 23.401 v8.16.0, Mar. 2012.
Third Generation Partnership Project, "Technical Specification Group Services and System Aspects; General Packet Radio Service (GPRS) Enhancements for Evolved Universal Terrestrial Radio Access Network (E-UTRAN) Access (Release 9)," 3GPP TS 23.401 v9.9.0, Jun. 2011.
Third Generation Partnership Project, "Technical Specification Group Services and System Aspects; General Packet Radio Service (GPRS) Enhancements for Evolved Universal Terrestrial Radio Access Network (E-UTRAN) Access (Release 9)," 3GPP TS 23.401 v9.13.0, Jun. 2012.
Third Generation Partnership Project, "Technical Specification Group Services and System Aspects; General Packet Radio Service (GPRS) Enhancements for Evolved Universal Terrestrial Radio Access Network (E-UTRAN) Access (Release 10)," 3GPP TS 23.401 v10.4.0, Jun. 2011.
Third Generation Partnership Project, "Technical Specification Group Services and System Aspects; General Packet Radio Service (GPRS) Enhancements for Evolved Universal Terrestrial Radio Access Network (E-UTRAN) Access (Release 10)," 3GPP TS 23.401 v10.8.0, Jun. 2012.
Third Generation Partnership Project, "Technical Specification Group Services and System Aspects; General Packet Radio Service (GPRS) Enhancements for Evolved Universal Terrestrial Radio Access Network (E-UTRAN) Access (Release 11)," 3GPP TS 23.401 v11.2.0, Jun. 2012.
Third Generation Partnership Project, "Technical Specification Group Core Network and Terminal; Non-Access-Stratum (NAS) protocol for Evolved Packet System (EPS); Stage 3(Release 8)," 3GPP TS 24.301 V8.10.0 (Jun. 2011).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.7.0 (Jun. 2012).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.7.0 (Jun. 2011).
Third Generation Partnership Project, "Technical Specification Group Core Network and Terminals; Non-Access-Stratum (NAS) protocol for Evolved Packet Systems (EPS); Stage 3 (Release 9)," 3GPP TS 24.301 V9.10.0 (Jun. 2012).
Third Generation Partnership Project, "Technical Specification Group Core Network and Terminals; Non-Access-Stratum (NAS) protocol for Evolved Packet Systems (EPS); Stage 3 (Release 10)," 3GPP TS 24.301 V10.3.0 (Jun. 2011).
Third Generation Partnership Project, "Technical Specification Group Core Network and Terminals; Non-Access-Stratum (NAS) protocol for Evolved Packet Systems (EPS); Stage 3 (Release 11)," 3GPP TS 24.301 V11.3.0 (Jun. 2012).
Third Generation Partnership Project, "Technical Specification Group Radio Access Network; Evolved Universal Terrestrial Radio Access (E-UTRA); Physical layer procedured (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedured (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedured (Release 10)," 3GPP TS 36.213 V10.2.0 (Jun. 2011).
Third Generation Partnership Project, "Technical Specification Group Radio Access Network; Evolved Universal Terrestrial Radio Access (E-UTRA); Physical layer procedured (Release 10)," 3GPP TS 36.213 V10.6.0 (Jun. 2012).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).

(56) References Cited

OTHER PUBLICATIONS

Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.2.0 (Jun. 2011).

Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).

Third Generation Partnership Project, "Technical Specification Group Radio Access Network; Evolved Universal Terrestrial Radio Access (E-UTRA); Multiplexing and channel coding (Release 10)," 3GPP TS 36.212 V10.6.0 (Jun. 2012).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2010).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.17.0 (Jun. 2012).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.2.0 (Jun. 2011).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.14.0 (Jun. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.7.0 (Jun. 2011).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.11.0 (Jun. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.2.0 (Jun. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.6.0 (Jun. 2012).

Third Generation Partnership Project, "Technical Specification Group Radio Access Network; Evolved Universal Terrestrial Radio Access (E-UTRA); Radio Resource Control (RRC); Protocol Specification (Release 11)," 3GPP TS 36.331 V11.0.0 (Jun. 2012).

Third Generation Partnership Project, "Technical Specification Group Services and System Aspects; IP flow mobility and seamless Wireless Local Area Network (WLAN) offload; Stage 2 (Release 10)," 3GPP TS 23.261 V10.1.0 (Sep. 2010).

Third Generation Partnership Project, "Technical Specification Group Services and System Aspects; IP flow mobility and seamless Wireless Local Area Network (WLAN) offload; Stage 2 (Release 10)," 3GPP TS 23.261 V10.2.0 (Mar. 2012).

Third Generation Partnership Project, "Technical Specification Group Services and System Aspects; 3GPP System Architecture Evolution (SAE); Security architecture (Release 8)," 3GPP TS 33.401 V8.8.0 (Jun. 2011).

Third Generation Partnership Project, "Technical Specification Group Services and System Aspects; 3GPP System Architecture Evolution (SAE); Security architecture (Release 9)," 3GPP TS 33.401 V9.7.0 (Jun. 2011).

Third Generation Partnership Project, "Technical Specification Group Services and System Aspects; 3GPP System Architecture Evolution (SAE); Security architecture (Release 10)," 3GPP TS 33.401 V10.1.1 (Jun. 2011).

Third Generation Partnership Project, "Technical Specification Group Services and System Aspects; 3GPP System Architecture Evolution (SAE); Security architecture (Release 10)," 3GPP TS 33.401 V10.3.0 (Jun. 2012).

Third Generation Partnership Project, "Technical Specification Group Services and System Aspects; 3GPP System Architecture Evolution (SAE); Security architecture (Release 11)," 3GPP TS 33.401 V11.0.0 (Jun. 2011).

Third Generation Partnership Project, "Technical Specification Group Services and System Aspects; 3GPP System Architecture Evolution (SAE); Security architecture (Release 11)," 3GPP TS 33.401 V11.4.0 (Jun. 2012).

Tomici et al., "Multi-RAT Traffic Offloading Solutions for the Bandwidth Crunch Problem," Systems, Applications and Technology Conference (LISAT), IEEE Long Island, May 6, 2011, pp. 1-6.

ZTE, "Consideration on the Aggregation of LTE and HSPA," R1-111173, 3GPP TSG-RAN WG1 Meeting #64, Taipei, Taiwan, Feb. 21-25, 2011.

Third Generation Partnership Project, "Technical Specification Group Services and System Aspects; Operator Policies for IP Interface Selection (OPIIS); (Release 11)," 3GPP TR 23.853 V0.2.0 (May 2011).

Third Generation Partnership Project, "Technical Specification Group Services and System Aspects; Operator Policies for IP Interface Selection (OPIIS); (Release 12)," 3GPP TR 23.853 V0.4.0 (May 2012).

Third Generation Partnership Project, "Technical Specification Group Core Network and Terminals; Access Network Discovery and Selection Function (ANDSF) Management Object (MO) (Release 11)," 3GPP TS 24.312 V11.3.0 (Jun. 2012).

Third Generation Partnership Project, "Technical Specification Group Core Network and Terminals; Access Network Discovery and Selection Function (ANDSF) Management Object (MO) (Release 10)," 3GPP TS 24.312 V10.6.0 (Jun. 2012).

Third Generation Partnership Project, "Technical Specification Group Services and System Aspects; Architecture enhancements for non-3GPP accesses (Release 8)," 3GPP TS 23.402 V8.9.0 (Jun. 2010).

Third Generation Partnership Project, "Technical Specification Group Services and System Aspects; Architecture enhancements for non-3GPP accesses (Release 8)," 3GPP TS 23.402 V8.10.0 (Mar. 2012).

Third Generation Partnership Project, "Technical Specification Group Services and System Aspects; Architecture enhancements for non-3GPP accesses (Release 9)," 3GPP TS 23.402 V9.9.0 (Jun. 2011).

Third Generation Partnership Project, "Technical Specification Group Services and System Aspects; Architecture enhancements for non-3GPP accesses (Release 9)," 3GPP TS 23.402 V9.12.0 (Mar. 2012).

(56) References Cited

OTHER PUBLICATIONS

Third Generation Partnership Project, "Technical Specification Group Services and System Aspects; Architecture enhancements for non-3GPP accesses (Release 10)," 3GPP TS 23.402 V10.4.0 (Jun. 2011).
Third Generation Partnership Project, "Technical Specification Group Services and System Aspects; Architecture enhancements for non-3GPP accesses (Release 10)," 3GPP TS 23.402 V10.7.0 (Mar. 2012).
Third Generation Partnership Project, "Technical Specification Group Core Network and Terminals; Access Network Discovery and Selection Function (ANDSF) Management Object (MO) (Release 8)," 3GPP TS 24.312 V8.5.0 (Mar. 2010).
Third Generation Partnership Project, "Technical Specification Group Core Network and Terminals; Access Network Discovery and Selection Function (ANDSF) Management Object (MO) (Release 8)," 3GPP TS 24.312 V8.6.0 (Jun. 2012).
Third Generation Partnership Project, "Technical Specification Group Core Network and Terminals; Access Network Discovery and Selection Function (ANDSF) Management Object (MO) (Release 9)," 3GPP TS 24.312 V9.1.0 (Mar. 2010).
Third Generation Partnership Project, "Technical Specification Group Core Network and Terminals; Access Network Discovery and Selection Function (ANDSF) Management Object (MO) (Release 9)," 3GPP TS 24.312 V9.3.0 (Jun. 2012).
Third Generation Partnership Project, "Technical Specification Group Core Network and Terminals; Access Network Discovery and Selection Function (ANDSF) Management Object (MO) (Release 10)," 3GPP TS 24.312 V10.3.0 (Jun. 2011).
Nokia Corporation (Rapporteur), "Revised Carrier Aggregation for LTE WID—core part," 3GPP TSG RAN#48, RP-100661, Seoul, South Korea (Jun. 1-4, 2010).
Nokia Corporation (Rapporteur), "Revised Carrier Aggregation for LTE WID—performance part," 3GPP TSG RAN#48, RP-100661, Seoul, South Korea (Jun. 1-4, 2010).
Nokia Corporation (Rapporteur), "Revised Carrier Aggregation for LTE WID," 3GPP TSG RAN#48, RP-100661, Seoul, South Korea (Jun. 1-4, 2010).
Third Generation Partnership Project, "Technical Specification Group Core Network and Terminals; Mobile radio interface Layer 3 specification; Core network protocols; Stage 3 (Release 4)," 3GPP TS 24.008 V4.17.0 (Sep. 2007).
Third Generation Partnership Project, "Technical Specification Group Core Network; Mobile radio interface layer 3 specification; Core Network Protocols; Stage 3 (Release 1999)," 3GPP TS 24.008 V3.20.0 (Dec. 2005).
Third Generation Partnership Project, "Technical Specification Group Core Network and Terminals; Mobile radio interface Layer 3 specification; Core network protocols; Stage 3 (Release 5)," 3GPP TS 24.008 V5.16.0 (Jun. 2006).
Third Generation Partnership Project, "Technical Specification Group Core Network and Terminals; Mobile radio interface Layer 3 specification; Core network protocols; Stage 3 (Release 6)," 3GPP TS 24.008 V6.20.0 (Mar. 2010).
Third Generation Partnership Project, "Technical Specification Group Core Network and Terminals; Mobile radio interface Layer 3 specification; Core network protocols; Stage 3 (Release 7)," 3GPP TS 24.008 V7.15.0 (Mar. 2010).
Third Generation Partnership Project, "Technical Specification Group Core Network and Terminals; Mobile radio interface Layer 3 specification; Core network protocols; Stage 3 (Release 8)," 3GPP TS 24.008 V8.14.0 (Jun. 2011).
Third Generation Partnership Project, "Technical Specification Group Core Network and Terminals; Mobile radio interface Layer 3 specification; Core network protocols; Stage 3 (Release 9)," 3GPP TS 24.008 V9.7.0 (Jun. 2011).
Third Generation Partnership Project, "Technical Specification Group Core Network and Terminals; Mobile radio interface Layer 3 specification; Core network protocols; Stage 3 (Release 10)," 3GPP TS 24.008 V10.3.0 (Jun. 2011).
Third Generation Partnership Project, "Technical Specification Group Core Network and Terminals; Mobile radio interface Layer 3 specification; Core network protocols; Stage 3 (Release 11)," 3GPP TS 24.008 V11.3.0 (Jun. 2012).
Third Generation Partnership Project, "Technical Specification Group Core Network and Terminals; Mobile radio interface Layer 3 specification; Core network protocols; Stage 3 (Release 10)," 3GPP TS 24.008 V10.7.0 (Jun. 2012).
Third Generation Partnership Project, "Technical Specification Group Core Network and Terminals; Mobile radio interface Layer 3 specification; Core network protocols; Stage 3 (Release 8)," 3GPP TS 24.008 V8.17.0 (Jun. 2012).
Third Generation Partnership Project, "Technical Specification Group Core Network and Terminals; Mobile radio interface Layer 3 specification; Core network protocols; Stage 3 (Release 9)," 3GPP TS 24.008 V9.11.0 (Jun. 2012).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.10.0 (Sep. 2011).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.7.0 (Sep. 2011).
Third Generation Partnership Project, "Technical Specification Group Core Network and Terminals; Access to the 3GPP Evolved Packet Core (EPC) via non-3GPP access networks; Stage 3 (Release 10)" 3GPP TS 24.302 V10.7.0 (Mar. 2012).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.3.0 (Jun. 2012).
Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.4.0 (Jun. 2011).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.6.0 (Jun. 2011).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.9.0 (Jun. 2011).
Third Generation Partnership Project, "Technical Specification Group Radio Access Network; Evolved Universal Terrestrial Radio Access (E-UTRA); Packet Data Convergence Protocol (PDCP) specification (Release 10)," 3GPP TS 36323 V10.1.0 (Mar. 2011).
Third Generation Partnership Project, "Technical Specification Group Radio Access Network; Evolved Universal Terrestrial Radio Access (E-UTRA); Packet Data Convergence Protocol (PDCP) specification (Release 9)," 3GPP TS 36323 V9.0.0 (Dec. 2009).
Third Generation Partnership Project, "Technical Specification Group Radio Access Network; Evolved Universal Terrestrial Radio Access (E-UTRA); Packet Data Convergence Protocol (PDCP) specification (Release 8)," 3GPP TS 36323 V8.6.0 (Jun. 2009).
Third Generation Partnership Project, "Technical Specification Group Radio Access Network; Evolved Universal Terrestrial Radio Access (E-UTRA); Radio Link Control (RLC) protocol specification (Release 10)," 3GPP TS 36.322 V10.0.0 (Dec. 2010).
Third Generation Partnership Project, "Technical Specification Group Radio Access Network; Evolved Universal Terrestrial Radio Access (E-UTRA); Radio Link Control (RLC) protocol specification (Release 9)," 3GPP TS 36.322 V9.3.0 (Sep. 2010).
Third Generation Partnership Project, "Technical Specification Group Radio Access Network; Evolved Universal Terrestrial Radio Access (E-UTRA); Radio Link Control (RLC) protocol specification (Release 8)," 3GPP TS 36.322 V8.8.0 (Jun. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).

(56) References Cited

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0 (Jun. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.2.0 (Jun. 2012).

LG Electronics, "New WID for Operator Policies for IP Interface Selection," TSG SA Meeting #51, SP-110222, Kansas City, USA (Mar. 21-23, 2011).

\* cited by examiner

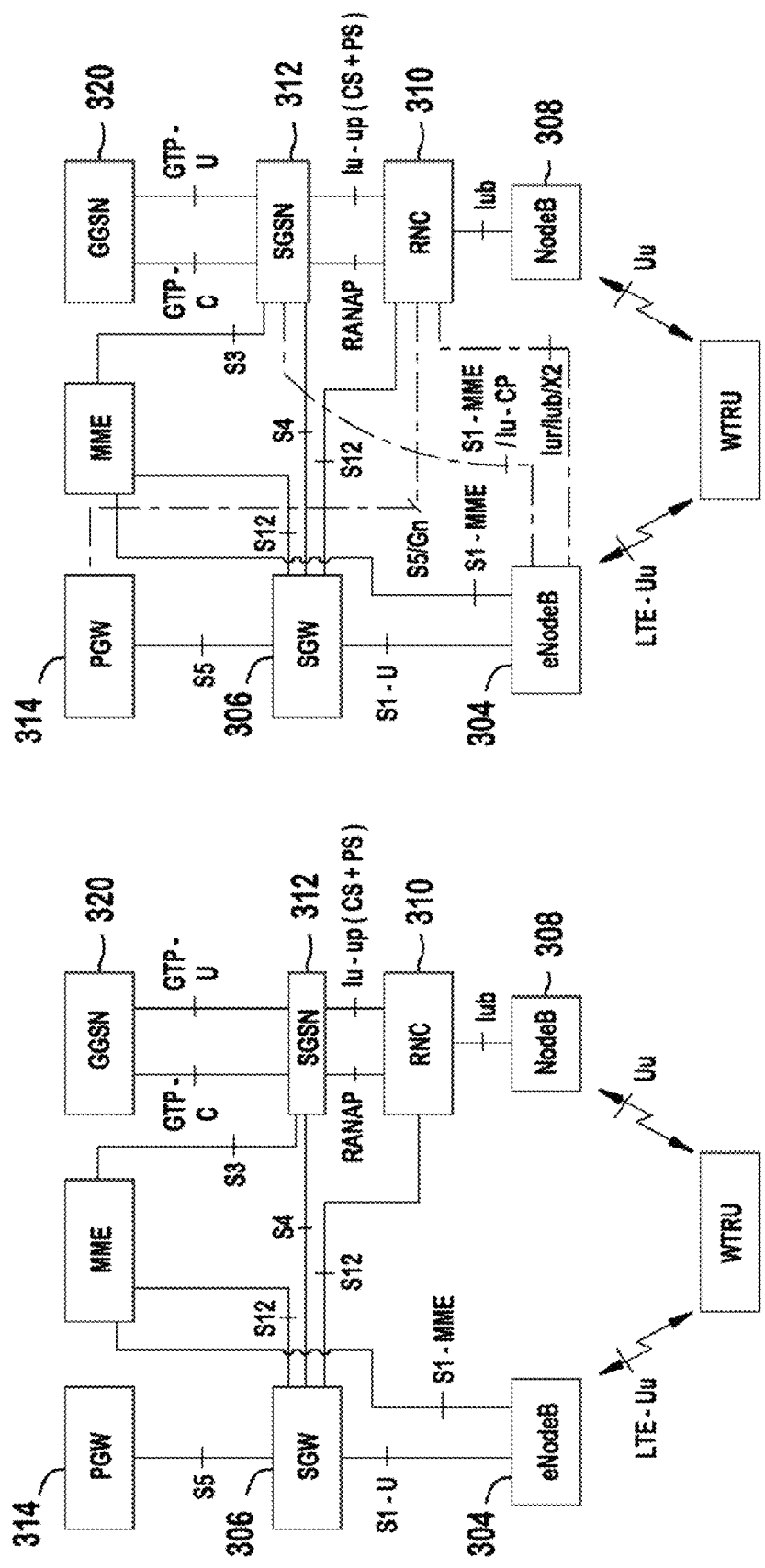

METHOD AND APPARATUS FOR MULTI-RAT ACCESS MODE OPERATION

CROSS REFERENCE TO RELATED APPLICATIONS

This application claims the benefit of U.S. provisional application No. 61/506,691 filed Jul. 12, 2011, the contents of which is hereby incorporated by reference herein.

BACKGROUND

The demand for improved network coverage, improved capacity and increasing bandwidth for both voice and data services in wireless systems has led to development of a number of radio access technologies (RATs) including, but not limited to, Global Systems Mobile Communications (GSM), Wideband Code Division Multiple Access (WCDMA), High Speed Packet Access (HSPA) including High Speed Downlink Packet Access (HSDPA) and High Speed Uplink Packet Access (HSUPA), and Long Term Evolution (LTE) including support for carrier aggregation in LTE Release 10 and beyond) in the Third Generation Partnership Project (3GPP), IEEE 802.11b/a/g/n, 802.16a/e and 802.20, as well as cdma2000 1× and cdma2000 EV-DO in 3GPP2.

3GPP WCDMA Release 8 introduced support for simultaneous use of two HSDPA downlink component carriers (2C-HSDPA), improving bandwidth usage with frequency diversity and resource pooling. 3GPP Release 9 introduced support for multiple-input multiple-output (MIMO) to the multicarrier downlink WCDMA. Release 9 also introduced support for two HSUPA uplink component carriers. 3GPP Release 10 introduced support for up to 4 downlink component carriers (4C-HSDPA), and Release 11 introduced support for up to 8 downlink carriers (8C-HSDPA).

3GPP LTE Release 10 introduced support for simultaneous transmission and/or reception using radio resources of a plurality of component carriers between a network node (i.e., evolved NodeB (eNB)) and a mobile terminal, (i.e., a wireless transmit/receive unit (WTRU)) within the same transmission time interval.

One of the objectives for LTE is to allow operators to deploy LTE using the same sites as for WCDMA deployments, and thereby reducing deployment and radio planning costs. Some operators may deploy both WCDMA/HSPA and LTE in the same coverage areas, with LTE as a data enhancement overlay. LTE deployments may have similar coverage as the existing WCDMA/HSPA deployments. Multi-mode wireless transmit/receive units (WTRUs), for example, supporting both WCDMA/HSPA and LTE, would be widely used.

Release 10 HSPA with MIMO offers downlink peak data rates of 42 Mbps, while Release 10 multicarrier HSPA will further increase the peak rate by introducing support for up to four downlink carriers. LTE Release 8/9 offers up to 100 Mbps in the single carrier downlink, while LTE Release 10 with (intra-RAT) carrier aggregation will further increase the peak rate by combining transmission resources of up to 5 component carriers. Spectrum is a costly resource and not all frequency bands may be available to all operators. Operators may offer support for both HSPA and LTE services, but carrier aggregation may be limited to at most 2-3 component carriers per RAT for a given operator. In addition, legacy deployments may be maintained for a foreseeable future while LTE is being deployed. This may lead to a situation where operators may see periods of underutilization of radio resources/spectrum and capacity in one of their RATs.

SUMMARY

A method and apparatus for multiple radio access technology (multi-RAT) access mode operation for a wireless transmit/receive unit (WTRU) are disclosed. A WTRU and a network may enable a multi-RAT access mode of operation based on at least one of WTRU subscription, a service agreement of the WTRU, a roaming status of the WTRU, a selected access point name (APN), an Internet protocol (IP) flow class, a subscriber profile identity for the WTRU, requested quality of service, or a proximity indication indicating proximity to a cell supporting multi-RAT access mode. The WTRU may send a capability indication of support of multi-RAT access to a network, wherein the multi-RAT access mode is enabled based on the capability indication. A partial handover of bearers may be performed. In performing the handover, the target cell is determined based on a priority rule. The proximity indication may be included in a tracking area update message, a routing area update message, an attach request message, or a PDN connectivity request message.

The WTRU may enable access to a network that supports local IP access (LIPA), selective IP traffic offload (SIPTO), or managed remote access (MRA) on a condition that a message received from the network indicates that traffic needs to be offloaded to a cell that supports multi-RAT access.

BRIEF DESCRIPTION OF THE DRAWINGS

A more detailed understanding may be had from the following description, given by way of example in conjunction with the accompanying drawings wherein:

FIGS. 3A-6C show alternative network architecture for multi-RAT access operations.

DETAILED DESCRIPTION

Figure 1A:
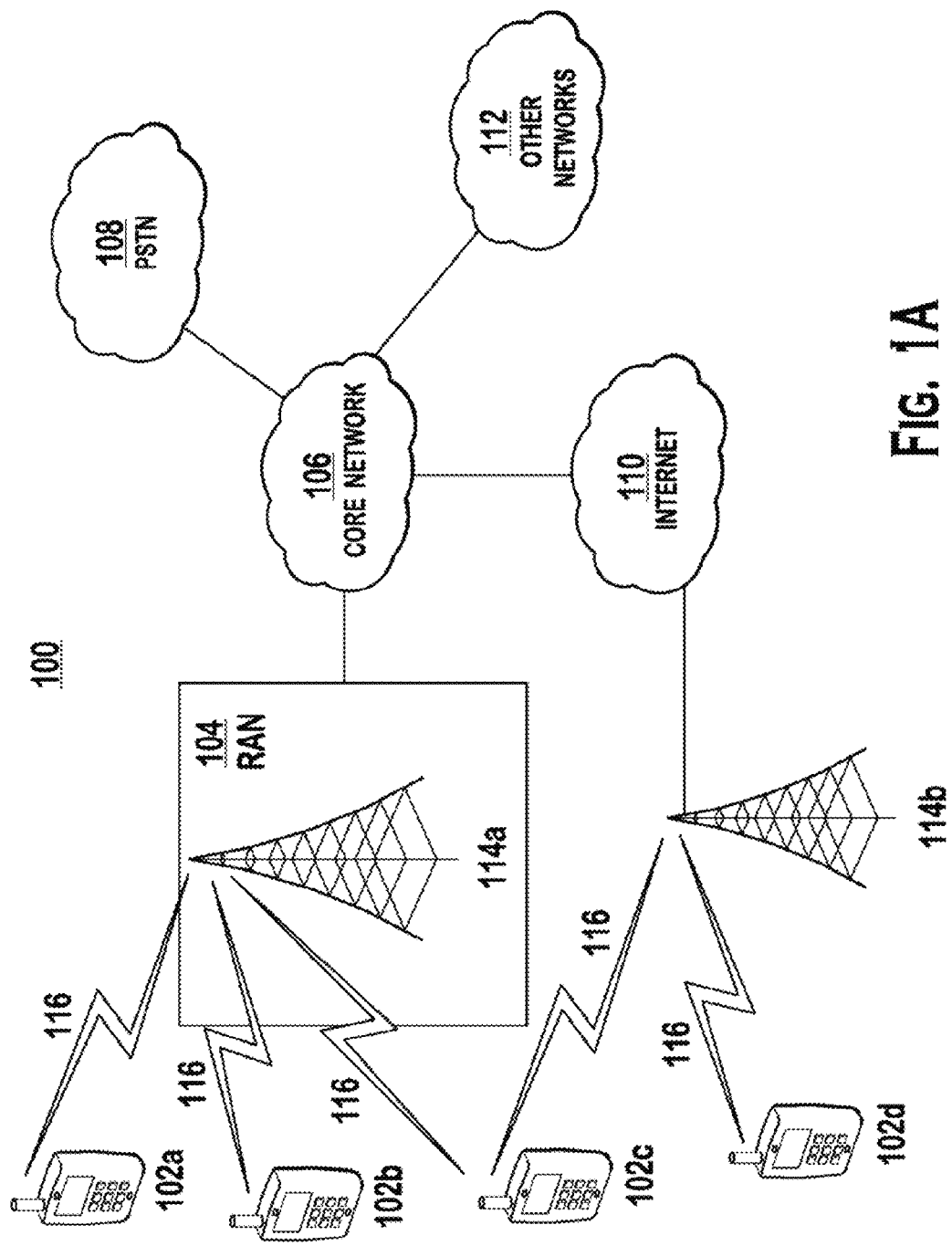
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
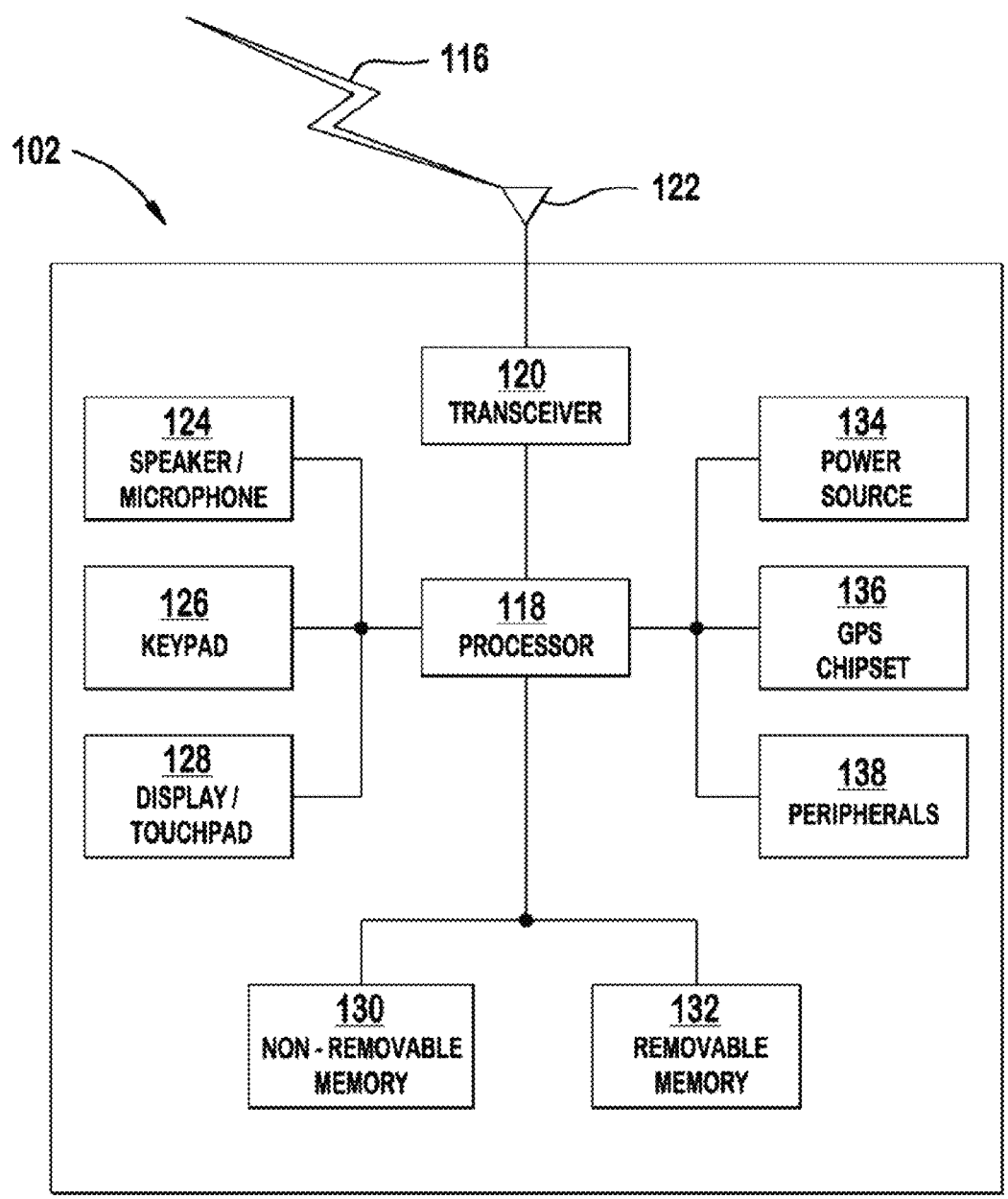
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
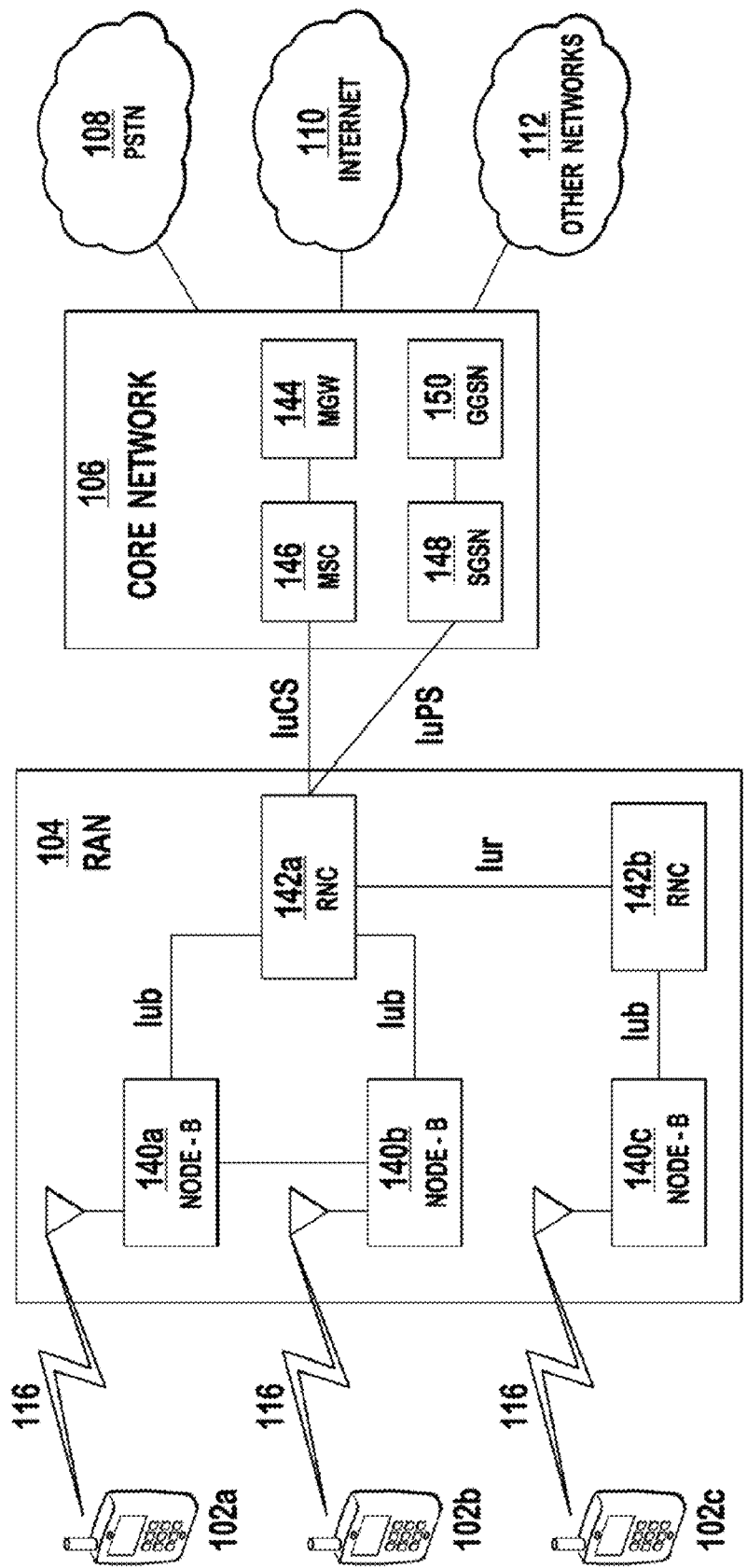
FIG. 1C is a system diagram of an example UMTS radio access network and an example UMTS core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
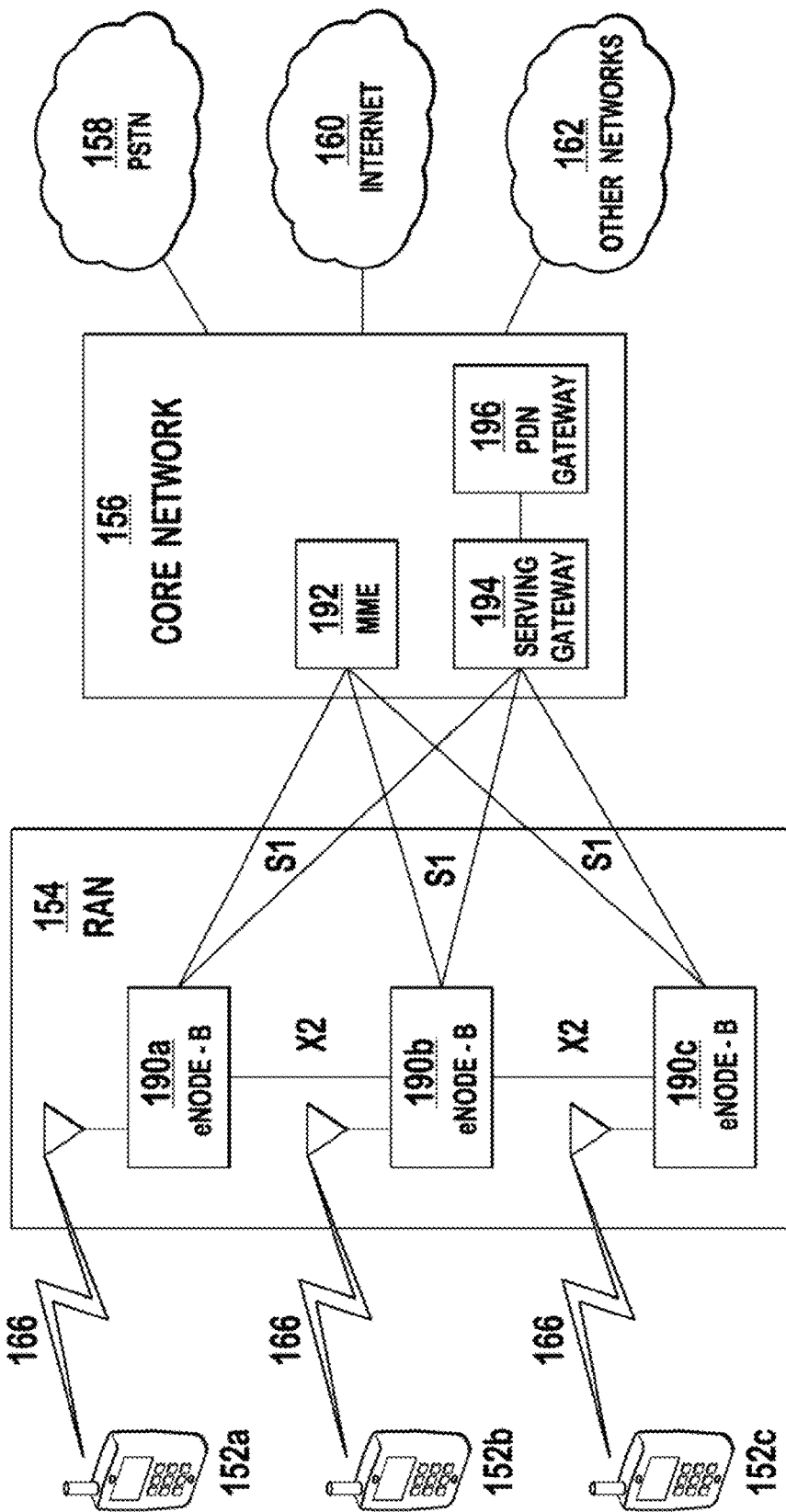
FIG. 1D is a system diagram of an example LTE RAN and an example LTE core network that may be used within the communications system illustrated in FIG. 1A.

FIG. 1D is a system diagram of an example LTE RAN 154 and an example LTE core network 156 that may be used within the communications system illustrated in FIG. 1A. The RAN 154 employs an E-UTRA radio technology to communicate with the WTRUs 152a, 152b, 152c over the air interface 166. The RAN 154 may also be in communication with the core network 156.

The RAN 154 may include eNode-Bs 190a, 190b, 190c, though it will be appreciated that the RAN 154 may include any number of eNode-Bs while remaining consistent with an embodiment. The eNode-Bs 190a, 190b, 190c may each include one or more transceivers for communicating with the WTRUs 152a, 152b, 152c over the air interface 166. In one embodiment, the eNode-Bs 190a, 190b, 190c may implement MIMO technology. Thus, the eNode-B 190a, for example, may use multiple antennas to transmit wireless signals to, and receive wireless signals from, the WTRU 152a.

Each of the eNode-Bs 190a, 190b, 190c may be associated with a particular cell (not shown) and may be configured to handle radio resource management decisions, handover decisions, scheduling of users in the uplink and/or downlink, and the like. As shown in FIG. 1D, the eNode-Bs 190a, 190b, 190c may communicate with one another over an X2 interface.

The core network 156 shown in FIG. 1D may include a mobility management gateway (MME) 192, a serving gateway 194, and a packet data network (PDN) gateway 196. While each of the foregoing elements are depicted as part of the core network 156, it will be appreciated that any one of these elements may be owned and/or operated by an entity other than the core network operator.

The MME 192 may be connected to each of the eNode-Bs 192a, 192b, 192c in the RAN 154 via an S1 interface and may serve as a control node. For example, the MME 192 may be responsible for authenticating users of the WTRUs 152a, 152b, 152c, bearer activation/deactivation, selecting a particular serving gateway during an initial attach of the WTRUs 152a, 152b, 152c, and the like. The MME 192 may also provide a control plane function for switching between the RAN 154 and other RANs (not shown) that employ other radio technologies, such as GSM or WCDMA.

The serving gateway 194 may be connected to each of the eNode Bs 190a, 190b, 190c in the RAN 154 via the S1 interface. The serving gateway 194 may generally route and forward user data packets to/from the WTRUs 152a, 152b, 152c. The serving gateway 194 may also perform other functions, such as anchoring user planes during inter-eNode B handovers, triggering paging when downlink data is available for the WTRUs 152a, 152b, 152c, managing and storing contexts of the WTRUs 152a, 152b, 152c, and the like.

The serving gateway 194 may also be connected to the PDN gateway 196, which may provide the WTRUs 152a, 152b, 152c with access to packet-switched networks, such as the Internet 160, to facilitate communications between the WTRUs 152a, 152b, 152c and IP-enabled devices.

The core network 156 may facilitate communications with other networks. For example, the core network 156 may provide the WTRUs 152a, 152b, 152c with access to circuit-switched networks, such as the PSTN 158, to facilitate communications between the WTRUs 152a, 152b, 152c and traditional land-line communications devices. For example, the core network 156 may include, or may communicate with, an IP gateway (e.g., an IP multimedia subsystem (IMS) server) that serves as an interface between the core network 156 and the PSTN 158. In addition, the core network 156 may provide the WTRUs 152a, 152b, 152c with access to the networks 162, which may include other wired or wireless networks that are owned and/or operated by other service providers.

When referred to hereafter, the term "access point name" (APN) correspond to a portal into a network (e.g., internet, packet data network, etc.). APNs are used to provide specific data services based on the definition of the APN as defined within the provisioned data rate plan. Each APN enables access to a network but the access and associated billing may be different from APN to APN When referred to hereafter, the term "packet data network (PDN) connection" corresponds to the association between a WTRU represented by one IP version 4 (IPv4) address and/or one IP version 6 (IPv6) prefix and a PDN represented by an APN.

When referred to hereafter, the term "non-access stratum" (NAS) corresponds to a functional layer in the wireless protocol stack between a core network (CN) and a WTRU. The NAS layer supports signaling and traffic between the CN and the WTRU. The functions of NAS include, but are not limited to, the following: connection management (CM), mobility management (MM), GPRS mobility management (GMM), session management (SM), EPS mobility management (EMM) and EPS session management (ESM), subscription management, security management and charging, and the like.

When referred to hereafter, the term "access stratum" (AS) corresponds to a functional layer in the wireless protocol stack between a radio access network (RAN) and a WTRU as well as the radio interface between the RAN nodes or between the RAN and the CN. The access stratum corresponds to features linked to the radio interface (access technology). It provides services related to the transmission of data over the radio interface and the management of the radio interface. The sublayers of the access stratum include radio resource control (RRC), packet data convergence protocol (PDCP), radio link control (RLC), medium access control (MAC), and physical layer (PHY).

When referred to hereafter, the term "primary cell" (e.g., PCell in LTE and primary serving cell in WCDMA) includes, without loss of generality, the cell operating on a primary frequency in which the WTRU perform the initial access to the system (e.g., a WTRU performs the initial connection establishment procedure or initiates the connection re-establishment procedure), or the cell indicated as a primary cell in the handover procedure, or the like. The primary cell may correspond to a frequency indicated as part of the radio resource connection configuration procedure. Some functions may be supported only on the primary cell. For example, the UL CC of the primary cell may correspond to the CC whose physical uplink control channel resources are configured to carry all hybrid automatic repeat request (HARQ) positive acknowledgement/negative acknowledgement (ACK/NACK) feedback for a given WTRU. In LTE, the WTRU uses the PCell to derive the parameters for the security functions and for upper layer system information such as NAS mobility information. Other functions that may be supported only on the PCell DL include system information acquisition, change monitoring procedures on the broadcast control channel (BCCH) and paging.

When referred to hereafter, the term "secondary cell" (e.g., SCell in LTE and secondary serving cell in WCDMA) includes, without loss of generality, the cell operating on a secondary frequency which may be configured once a radio resource control connection is established and which may be used to provide additional radio resources. System information relevant for operation in the secondary cell may be provided using dedicated signaling when the secondary cell is added to the WTRU's configuration. Although the parameters may have different values than those broadcasted on the downlink of the concerned secondary cell using the system information signaling, this information may be referred to as system information of the concerned secondary cell independently of the method used by the WTRU to acquire this information.

When referred to hereafter, the term "serving cell" includes, without loss of generality, a primary cell (e.g., a PCell) or a secondary cell (e.g., a SCell). For a WTRU that is not configured with any secondary cell or that does not support operation on multiple carriers, frequencies, or component carriers, (i.e., carrier aggregation), there is one serving cell, which is the primary cell. For a WTRU that is configured with at least one secondary cell, the term "serving cells" includes the set of one or more cells comprising the primary cell and all configured secondary cells.

When a WTRU is configured with at least one secondary cell, there may be one primary cell DL and one primary cell UL and, for each configured secondary cell, there may be one secondary cell DL and one secondary cell UL (if configured).

When referred to hereafter, the term "multi-mode WTRU" includes any WTRU supporting, and capable of operating simultaneously on, a plurality of RATs such as, but not limited to, GSM, WCDMA, HSPA, HSDPA, HSUPA and LTE, IEEE 802.11b/a/g/n, 802.16a/e and 802.20, cdma2000 1x, cdma2000 EV-DO, and the like.

When referred to hereafter, the term "primary RAT" means the RAT for which at least one serving cell is configured as a primary cell from which at least one of the following functions may be supported: the RRC connection is established and is connected, security parameters are derived, uplink resources are used to transmit uplink control information (UCI), and/or at least one serving cell is configured with uplink resources. The primary RAT and the anchor RAT may be referred to as the "first RAT."

When referred to hereafter, the term "secondary RAT" means an RAT used by one of the configured serving cells that is not the primary RAT of the WTRU's configuration.

Hereafter, the terminology "carrier," "frequency," and "component carrier" may be used interchangeably.

Embodiments for multi-RAT operation of a multi-mode WTRU supporting simultaneous (or near-simultaneous) operations on multiple carriers, frequencies, or component carriers (hereafter "carriers") of a plurality of RATs are explained hereafter. Embodiments will be explained with reference to two RATs of LTE and WCDMA/HSPA as an example, but the embodiments disclosed herein are applicable to any RATs and more than two RATs. The RATs involved may be on a single public land mobile network (PLMN) or different PLMNs.

Figure 2:
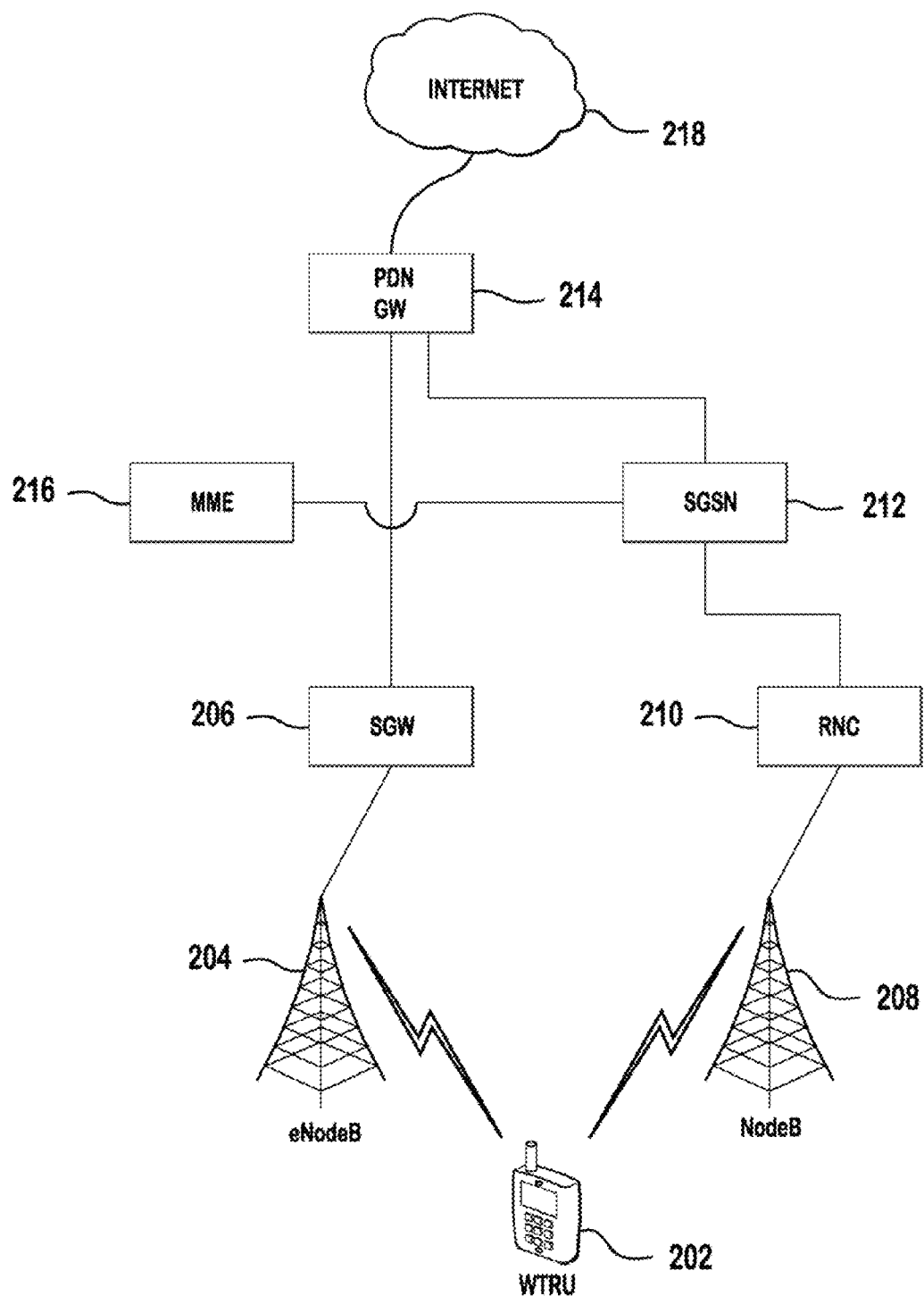
FIG. 2 shows an example network architecture, wherein data traffic from one PDN connection is mapped to multiple RATs.

FIG. 2 shows an example network architecture, wherein data traffic from one PDN connection is mapped to multiple RATs (LTE RAT and UTRAN RAT in this example). In FIG. 2, data traffic to and from the internet 218 is transferred via the PDN GW 214 from/to both the SGSN 212 and the SGW 206 in a user plane. The data traffic is transferred via the SGSN 212, the RNC 210, and the NodeB 208 to/from the WTRU 202 (i.e., multi-mode WTRU) on the UTRAN side, and via the SGW 206 and the eNobeB 204 to/from the WTRU 202 on the LTE side. There may also be a control plane connection between the MME 216 and the SGSN 212. It should be noted that a different user plane connection may be provided in a different network architecture. For example, the user plane may go from the PDN GW 214 to the SGW 206 and then to the RNC 210, or from the PDN GW 214 directly to the RNC 210. There may be a control plane connection between the eNB 204 and the RNC 210, between the MME 216 and the RNC 210, and/or between the SGW 206 and the RNC 210.

The multi-mode WTRU 202 supports a plurality of RATs such as, but not limited to, GSM, WCDMA, HSPA, HSDPA, HSUPA, LTE, IEEE 802.11b/a/g/n, 802.16a/e, 802.20, cdma2000 1x, cdma2000 EV-DO, or the like. The multi-mode WTRU 202 may be configured to operate with at least one carrier (a DL carrier, a UL carrier, or both) of a primary RAT and at least one carrier (a DL carrier, a UL carrier, or both) of a secondary RAT. In addition, the operations on the different carriers may occur either simultaneously, or near-simultaneously in time. Alternatively, the operations on different RATs may occur sequentially, (e.g., on the same carrier).

FIGS. 3A-6C show alternative network architectures for multi-RAT access operations. The embodiments disclosed herein are applicable to any of these architectures.

In FIGS. 3A and 3B, the user plane traffic may be transferred through two gateways, the PGW 314 and the GGSN 320. The LTE traffic is transmitted via the PGW 314, the SGW 306 and the eNodeB 304, and the UTRAN traffic is transmitted via the GGSN 320, the SGSN 312, the RNC 310, and the NB 308. A tunnel may be established between the RNC 310 and the SGW 306 for user plane traffic. Alternatively, as shown in FIG. 3B, a tunnel may be established between the PGW 314 and the RNC 310, between the SGSN 312 and the eNodeB 304, or between the RNC 310 and the eNodeB 304.

Figures 4A, 4B:
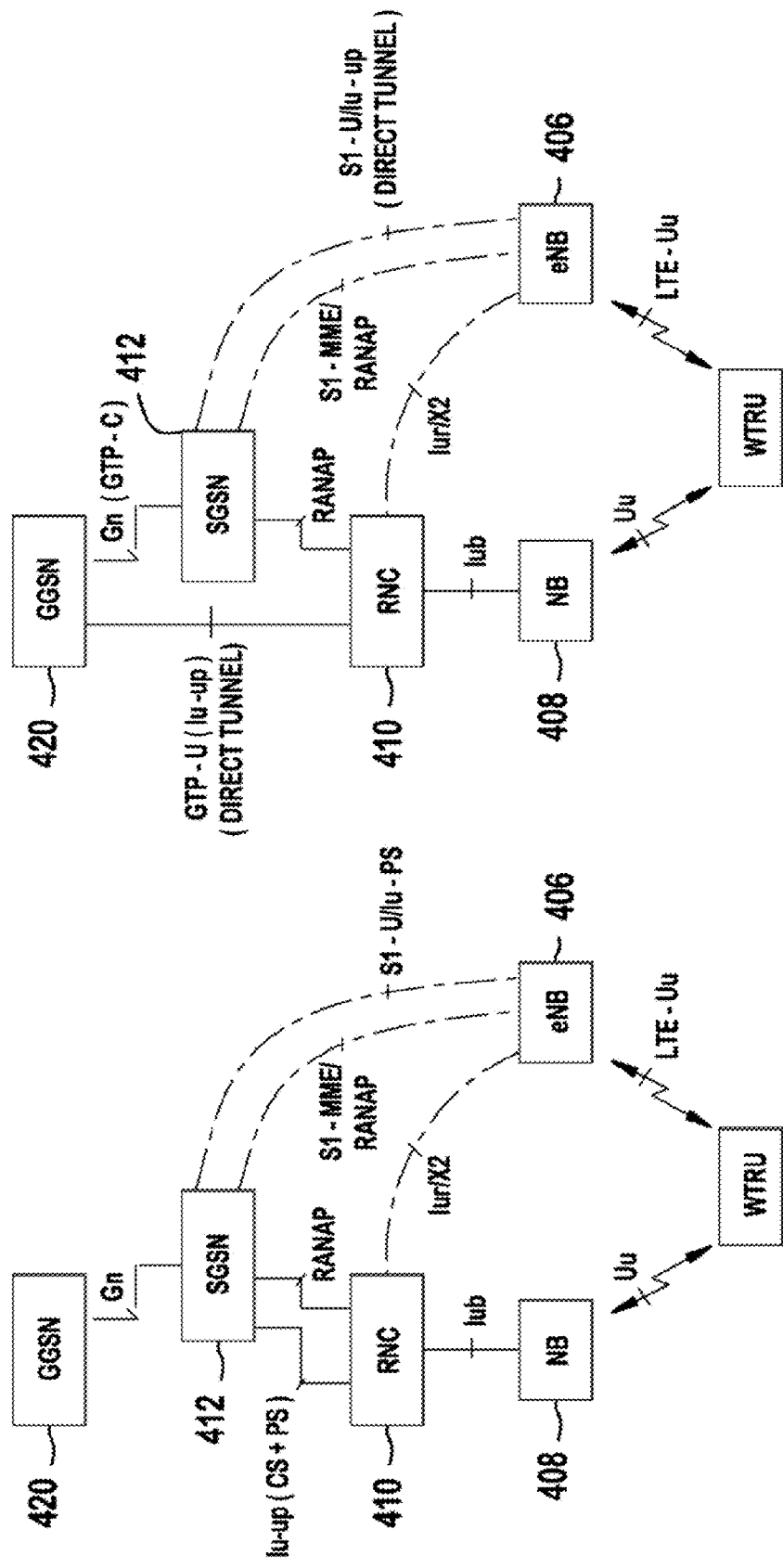

In FIGS. 4A and 4B, the user plane traffic may be transferred through a single gateway, the GGSN 420. In FIG. 4A, the traffic is split at the SGSN 412 to the RNC 410 and the eNodeB 404. Alternatively, as shown in FIG. 4B, a direct tunnel may be established between the GGSN 420 and the RNC 410 or between the GGSN 420 and the eNodeB 404.

Figures 5A, 5B:
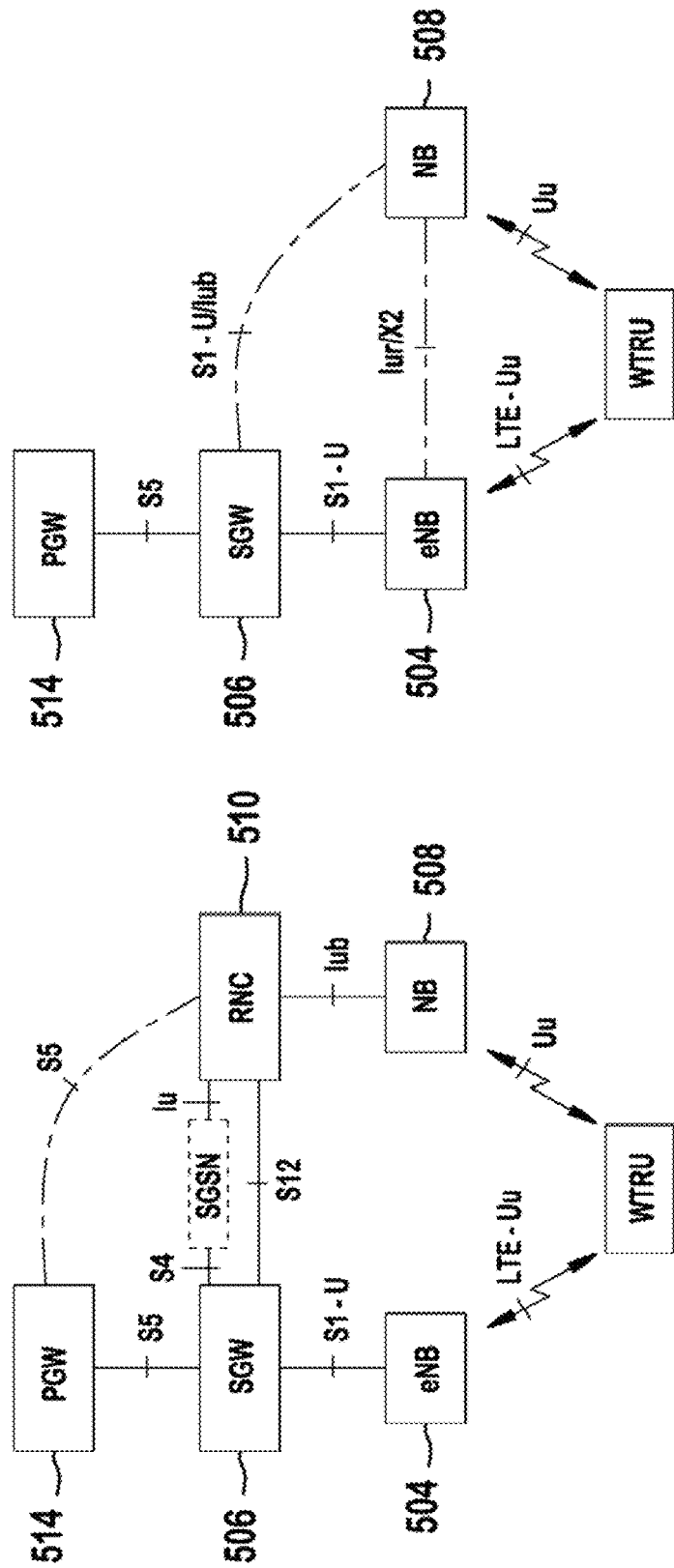

In FIGS. 5A and 5B, the user plane traffic may be transferred through a single gateway, the PGW 414. The traffic may be split at the SGW 406 to the eNodeB 404 and to the RNC 410. Alternatively, the traffic may be split at the PGW 414.

Figure 6A:
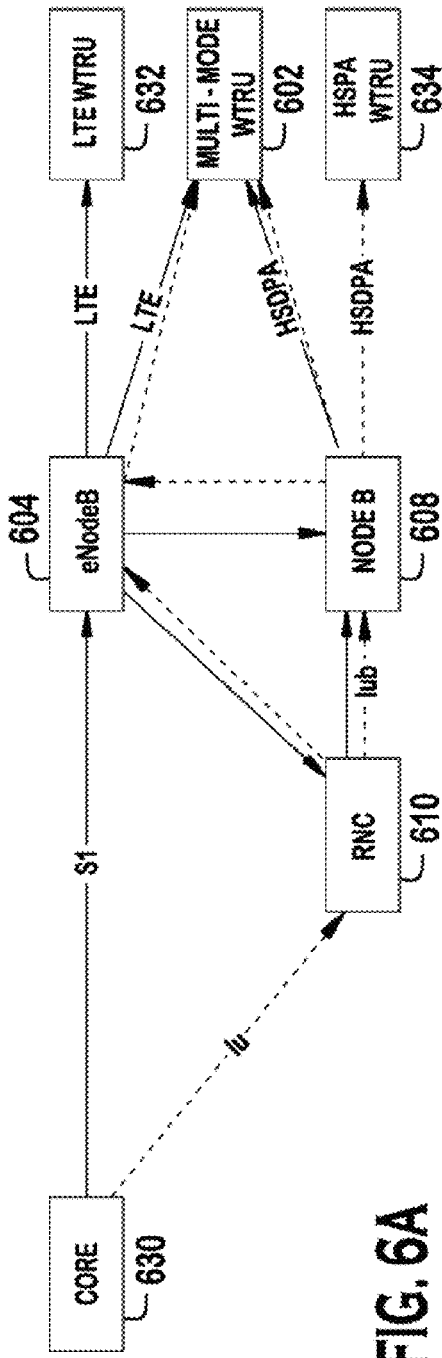

In FIG. 6A, the LTE traffic and the HSPA traffic from the core 630 are transmitted to the eNodeB 604 and to the RNC 610, respectively, and transmitted to the LTE WTRU 632 and the HSPA WTRU 634 via the eNodeB 604 and the NodeB 608, respectively. The traffic to the multi-mode WTRU 602 may be split at the eNodeB 604, the RNC 610, or the NodeB 608, and may be transmitted to the multi-mode WTRU 602 via both the eNodeB 604 and the NodeB 608.

Figure 6B:
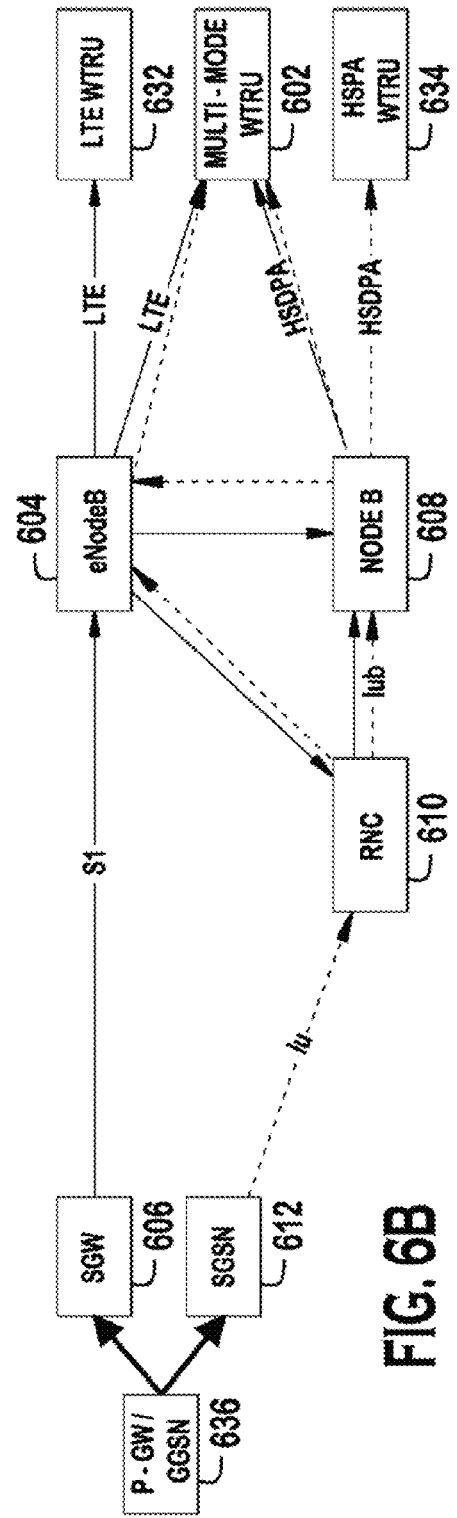
Figure 6C:
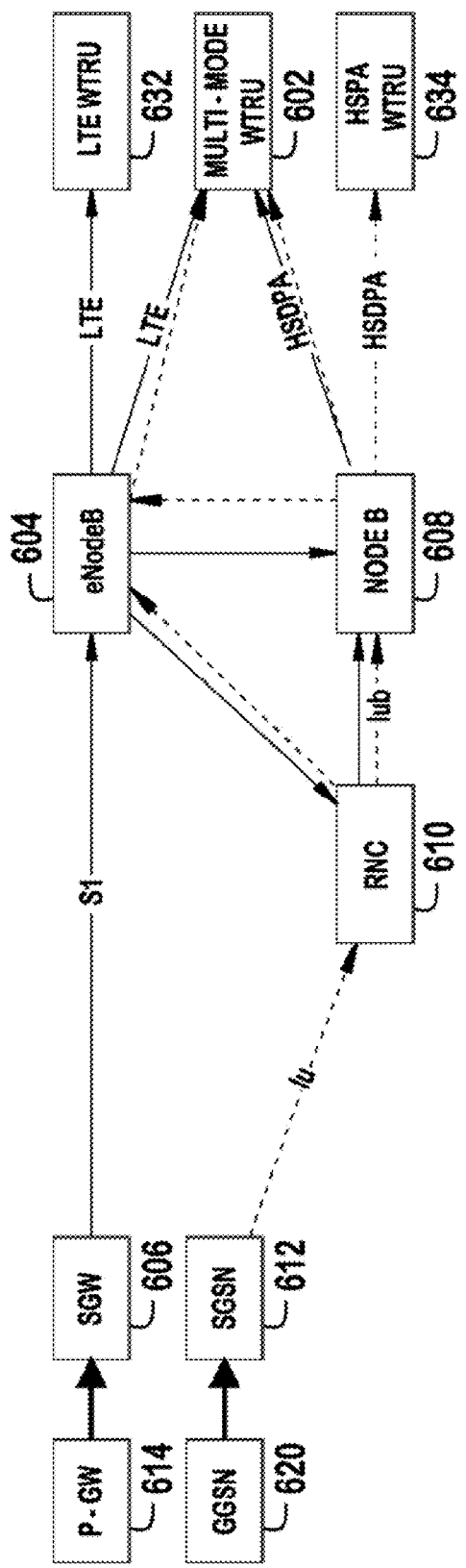

FIGS. 6B and 6C show the core network node more specifically. In FIG. 6B, the user plane traffic is routed through a single gateway (i.e., the co-located P-GW/GGSN 636) to the SGW 606 and the SGSN 612. In FIG. 6C, the user plane traffic is routed through separate gateways (i.e., the PGW 614 and the GGSN 620).

A WTRU and a network may enable and disable the multi-RAT access based on any or combination of the following information: WTRU capability, support of the multi-RAT access by the network, WTRU subscription and service level agreement (e.g., subscriber privileges or permissions), whether the WTRU is roaming or not, the selected APN, a service type or traffic type (e.g., local IP access (LIPA), selective IP traffic offload (SIPTO), remote IP access (RIPA), etc.), a subscriber profile ID (SPID), a cell access mode and a closed subscriber group (CSG) ID, quality of service (QoS) information and related threshold(s), application requirements, radio conditions and measurements and related threshold(s), core network overload control policy and triggers, a public land mobile network (PLMN) type (e.g., radio access network (RAN) sharing versus non-RAN sharing), multi-homing support (i.e., support for multiple IP addresses for the same application), operator configured policy information, proximity indication from a WTRU (i.e., proximity to cells with multiple RAT access capability), a specific IP flow or IP flow class, and the like.

If both a network and a WTRU support multi-RAT access, the WTRU and the network may enable multi-RAT access for the WTRU. The WTRU may indicate WTRU's support for multi-RAT access (i.e., WTRU capability) to the network. The WTRU may indicate the WTRU capability upon initial access or registration (e.g., RRC connection request, attach procedure, tracking area update (TAU), routing area update (RAU), etc.), upon PDN connectivity request, upon dedicated bearer request or service request, or the like. Support for multi-RAT access may also be indicated during handover to the target cell either by the WTRU, by the source cell, or by any network node.

Multi-RAT access may be enabled or disabled based on WTRU subscription and service level agreement. The WTRU may be multi-RAT access capable but may not be able to get service through multi-RAT access if the multi-RAT access is not supported by the subscription and service agreement. The subscription and service agreement information for the WTRU or user may be stored in the network (e.g., HSS/HLR).

Multi-RAT access may be enabled or disabled based on a roaming status (whether the WTRU is roaming or not). For example, the WTRU may or may not be allowed multi-RAT access while roaming, and the WTRU may enable or disable the multi-RAT access based on the roaming status.

Multi-RAT access may be enabled or disabled based on the type of the selected APN. A certain APN may be mapped to a certain RAT. A request for PDN connectivity on such APN either by the WTRU or by the core network may trigger multi-RAT access and establishment of bearers on the associated RAT(s).

Multi-RAT access may be enabled or disabled based on the requested service type. For example, while a WTRU has its LTE RAT active, a request for circuit switched (CS) services (e.g., short message service (SMS), supplementary service (SS), voice calls, etc.) may enable multi-RAT access.

Multi-RAT access may be enabled or disabled based on the type of traffic (e.g., LIPA, SIPTO, etc.). For example, when a WTRU is in a local network (e.g., a femto cell) and LIPA, SIPTO, or the like is used, the WTRU may enable the multi-RAT access. The WTRU may enable access to networks that support LIPA or SIPTO upon receipt of an RRC or NAS message indicating that traffic should be offloaded to the cell that supports multi-RAT access.

Multi-RAT access may be enabled or disabled based on the subscriber profile ID (SPID). An eNodeB receives the SPID parameter from the MME or a source eNodeB (for handover). For example, the SPID parameter may be contained in an initial context setup request message, a UE context modification request message, a handover request message, or the like. The SPID parameter received by the eNodeB is an index referring to user information (e.g., mobility profile, service usage profile). This index is mapped by the eNodeB to locally defined configuration to define, for example, camp priorities in an idle mode and to control inter-RAT/inter-frequency handover in an active mode. The SPID may be user specific and may be applied to all its radio bearers. Alternatively, the SPID may be applied to a specific service, a specific service data flow (SDF), a specific bearer, or a specific APN.

The SPID defined for RAT/frequency priority selection may be used to control the accessibility to services or traffic types such as LIPA, SIPTO or RIPA. The SPID may be used to enable, trigger, and terminate SIPTO, LIPA or RIPA mode of operation.

Multi-RAT access may be enabled or disabled based on the cell access mode and CSG ID. When a WTRU is connected to a local cell, (e.g., a femto cell) and the CSG ID matches, the WTRU may enable multi-RAT access.

Multi-RAT access may be enabled or disabled based on quality of service (QoS) information and related threshold(s) and/or application requirements. For example, if the application requires a particular QoS, multi-RAT may be enabled.

Multi-RAT access may be enabled or disabled based on proximity indication from a WTRU (i.e., proximity to cells with multiple RAT access capability). A WTRU detects a cell and may send a proximity indication to the network indicating that the WTRU is near the specific cell. The WTRU may enable multi-RAT access if the WTRU is near a particular cell, (e.g., based on a CSG ID).

The activation or decision to use multi-RAT access may be triggered based on one or more predetermined criteria.

Multi-RAT access may be activated if the maximum bit rate (that can be provided over one RAT, over one RAT for a given APN, over one RAT for a given traffic type or a given service type) would be surpassed if multi-RAT access is not activated. The maximum bit rates may be determined based on the WTRU subscription information stored in the core network, (e.g., HSS, HLR).

Alternatively, multi-RAT access may be activated based on the type of the requested APN. Certain APNs may be mapped to certain RATs. A request for PDN connectivity on such APNs either by the WTRU or by the core network may trigger multi-RAT access and establishment of bearers on the associated RATs.

Alternatively, multi-RAT access may be activated upon activation of certain types of traffic (e.g., LIPA, SIPTO, RIPA, etc.).

Alternatively, multi-RAT access may be activated upon a determination by the current serving cell to handover certain bearers (or PDN connection) to another cell. The serving cell may send a request to the core network (e.g., MME and/or SGSN) to offload some of the bearers. The serving cell may indicate to the core network the target cell (or cells) for handover.

Alternatively, multi-RAT access may be activated upon determination by the WTRU based on a radio condition or any other access information. Upon such determination, the WTRU may send an access stratum message to the RAN or a non-access stratum message to the core network to initiate the offload of some bearers or setup a new bearer or a PDN connection in a multi-RAT access mode. The WTRU may indicate the candidate RAT or candidate cell in the message.

Alternatively, multi-RAT access may be activated based on the type of service requested. For example, if packet switched (PS) service is requested, an RAT that provides a PS service (such as LTE) may be activated. For example, if the WTRU has its LTE RAT active, a request for circuit switched (CS) services (e.g., short message service (SMS), SS, voice calls, etc.) may trigger activation/initiation of multi-RAT access.

Alternatively, multi-RAT access may be activated upon request from the user (e.g., via a user interface or change of the WTRU settings by the user). The WTRU settings may be changed via operation, maintenance, accounting (OMA) device management (DM) or over-the-air (OTA).

Alternatively, multi-RAT access may be activated upon receipt of an explicit indication to operate in multi-RAT access. The WTRU may receive this indication from any network node (i.e., any RAN node (e.g., RNC, eNB, etc) or any CN node (e.g., MME, SGSN, etc.)).

Alternatively, multi-RAT access may be activated based on load condition and threshold(s) (e.g., as part of load balancing).

Alternatively, multi-RAT access may be activated upon receipt of an indication that the system supports multi-RAT access. If the WTRU receives such indication, the WTRU may display that information to the user so that the user may make a decision to activate the multi-RAT access. The WTRU may also indicate to the user that the network does not support multi-RAT access.

Alternatively, multi-RAT access may be activated based on a proximity indication.

Alternatively, multi-RAT access may be activated based on security mode reconfiguration.

Multi-RAT access may be triggered from the beginning (e.g., based on subscription, WTRU capabilities, application requirements such as high throughput, or the like) or subsequently, for example, when the radio conditions warrant activation of additional RAT carriers while the WTRU is in a connected mode (e.g., the WTRU is at the center of the cell). For example, if a policy requires load to be evenly distributed, a network load above a certain threshold may trigger initialization of a second RAT for multi-RAT access. Alternatively, multi-RAT access may be triggered based on different criteria, for example, application or QoS requirements.

A WTRU may, autonomously or upon indication from the user, initiate the multi-RAT access. Upon such determination, the WTRU may send an access stratum level message to the RAN or an NAS level message to the core network to initiate offload of some bearers or setup a new bearer or PDN connection in a multi-RAT access mode. The WTRU may indicate candidate RATs and/or candidate cells in the message. The WTRU may initiate the multi-RAT access by selecting a relevant APN, type of service, and/or type of traffic.

Alternatively, a radio access network node, (e.g., NodeB, eNodeB, home (e)NodeB (H(e)NB), RNC), may initiate operation in a multi-RAT access mode. For example, upon reception of an access request from a WTRU (e.g., RRC connection request), upon reception from the core network of messages related to bearer resources establishment (e.g., radio access bearer (RAB) assignment request, relocation request, initial context setup request, E-RAB setup request, handover request), or upon reception of a request from another RAN node related to bearer resources establishment (e.g., enhanced relocation information request, handover request), the RAN node may establish part of the requested bearer resources toward another cell and on another RAT thereby triggering multi-RAT access mode. The RAN node may also make the decision as part of a handover procedure to handover a subset of the bearers of a WTRU served by the current RAN node to another node on a different RAT thereby triggering multi-RAT access mode of operation.

In another example, to offload traffic and reduce load, or as part of a handover procedure, the serving RAN node may decide to handover part of the current bearers of the WTRU to the target cell on another RAT, thereby triggering multi-RAT access mode of operation.

Alternatively, a core network (e.g., MME, SGW, PGW, SGSN, PCRF, etc.) may trigger operation in multi-RAT access mode. For example, the core network may page the WTRU for a mobile-terminated session on multiple RATs and require the WTRU to initiate connections on multiple RATs such that bearer resources may be established on multiple RATs.

The multi-RAT access mode of operation may be triggered at any of the following moments: during registration (network attachment), during any system access or mobility management procedure (e.g., registration (network attachment), TAU/RAU, service request (transition from an idle mode to a connected mode)), during any session management procedure including dedicated bearer activation, bearer modification with or without QoS update, or additional PDN connectivity establishment, during handover, or the like.

The multi-RAT access mode may be activated in an idle mode or in a connected mode. For example, multi-RAT access operation capability and related criteria may be considered during cell selection. Non-multi-RAT-capable WTRUs may not select the multi-RAT-capable cells in both idle and connected modes. Multi-RAT access triggering decision may be made at the time of PLMN selection. A WTRU may take into account the need to operate in a multi-RAT access mode during the PLMN selection. The multi-RAT access mode of operation may be restricted or forbidden at certain moments or in certain states of the WTRU. For example, multi-RAT operation may be restricted or forbidden when the WTRU is in an IDLE mode, or during the execution of a handover procedure. For example, if multi-RAT access is activated on both UTRAN and E-UTRAN prior to a handover procedure and the handover operation develops towards an E-UTRAN RAT, the UTRAN RAT may be deactivated prior to the handover and reactivated after the successful handover operation.

The multi-RAT access mode of operation may be terminated based on any or combination of the criteria for initiation of the multi-RAT access modes that are disclosed above.

Multi-RAT access may be deactivated if the maximum bit rate that can be provided over one RAT, over one RAT for a given APN, or over one RAT for a given traffic type or a given service type meets the user bearers' data rate requirements. The maximum bit rate may be determined based on WTRU subscription information stored in the network, (e.g., HSS, HLR).

Multi-RAT access may be deactivated if the type of APN requested by the user is changed. A certain APN may be mapped to a certain RAT. A request for PDN connectivity on such APN either by the WTRU or the core network may trigger establishment of bearers on the associated RATs. Therefore, a change in APN requested by the user may lead to the deactivation of the multi-RAT access if the APN requires one RAT.

Multi-RAT access may be deactivated upon de-activation of certain types of traffic (e.g., LIPA, SIPTO, RIPA, etc.).

Multi-RAT access may be deactivated as result of handover. If all the WTRU bearers are on one RAT after handover, the multi-RAT access may be deactivated. In this case, the RAN node (e.g., the source cell and/or the serving cell) may send an indication to the core network and/or to the WTRU to deactivate the multi-RAT access operation.

Multi-RAT access may be deactivated upon a determination by the WTRU, for example, based on radio condition or any other access information. Upon such determination, the WTRU may send an access stratum level message to the RAN or a non-access stratum level message to the core network to deactivate multi-RAT access.

Multi-RAT access may be deactivated if the type of requested service changes. For example, while a WTRU has its LTE RAT active, a request for CS services (e.g., SMS, SS, voice calls) triggers the activation/initiation of multi-RAT access. Upon termination of the CS service, the WTRU may deactivate the multi-RAT access and operate only on the LTE RAT for the PS service.

Multi-RAT access may be deactivated upon request from the user (e.g., via a user interface or change of the WTRU settings by the user). The WTRU settings may be changed via OMA DM or OTA, (i.e., the WTRU may be informed to deactivate multi-RAT access).

Multi-RAT access may be deactivated upon receipt of an explicit indication to deactivate the multi-RAT access. The WTRU may receive this indication from any network node in the system, i.e., any RAN node (e.g., RNC, eNodeB, etc.) or any CN node (e.g., MME, SGSN, etc.).

Multi-RAT access may be deactivated based on load thresholds (as part of load balancing). For example, if the network load decreases below a certain threshold, multi-RAT access may be deactivated.

Multi-RAT access may be deactivated upon receipt of an indication (or command) that multi-RAT access is disabled or temporarily disabled. If the WTRU receives such an indication (or command), the WTRU may display such deactivation to the user. The WTRU may also indicate to the user that the network does not support multi-RAT access.

Multi-RAT access may be deactivated based on proximity to a certain cell. For example, if a WTRU has left the cells or areas that support multi-RAT access, the WTRU may deactivate multi-RAT access.

Multi-RAT access may be deactivated upon security mode reconfiguration. Due to WTRU mobility, the network may change or reconfigure the security parameters (e.g., the encryption algorithms) for command integrity protection and/or data ciphering operations when the WTRU switches between CN controlling nodes (e.g., SGSNs or MMEs) or when the WTRU switches between radio access network nodes (e.g., the (e)NodeBs). The change may impact the multi-RAT operations in terms of QoS degradation or encryption incompatibility. In these cases, the multi-RAT access operation may be deactivated. The CN controlling node (originating or target SGSN/MME or triggered by the involved RAN node) may determine the multi-RAT operation discontinuation and may notify the multi-RAT operational entities (including the WTRU) to deactivate the multi-RAT access operation in this particular RAT. The CN controlling entity may employ new messages for that deactivation purpose or may include the deactivation indication in the existing 3GPP messages. The CN controlling node may send the security mode reconfiguration messages to the WTRU with the deactivation indication. The WTRU after receiving the security reconfiguration command may notify the controlling node for deactivation and to stop the multi-RAT access operation from the WTRU point of view.

A WTRU in a multi-RAT access mode may be in an idle mode on one RAT while in a connected mode on another RAT. The transition between idle and connected states in each RAT may occur independently of each other. Alternatively, the WTRU may not be in an idle mode on one RAT while in a connected mode on another RAT. Alternatively, once a WTRU is in an idle mode on a given RAT, a timer may be started in the WTRU, in the radio access network, or in the core network, and the WTRU, the radio access network, or the core network may transition from a multi-RAT access mode of operation to a single RAT mode of operation upon expiration of the timer. Alternatively, the WTRU, the radio access network, or the core network may explicitly request the WTRU, the radio access network, or the core network to transition from the multi-RAT access mode to the single RAT access mode, or vice versa.

The WTRU autonomously or upon indication from the user may terminate the multi-RAT access. For example, the WTRU may terminate the multi-RAT access upon determination by the WTRU, for example, based on radio condition or any other multi-RAT access deactivation information/criteria disclosed above. Upon such determination, the WTRU may send an access stratum message to the RAN or a non-access stratum message to the core network to terminate/deactivate multi-RAT access mode of operation. The WTRU may indicate the RATs and/or the candidate cells where to deactivate the multi-RAT access.

A radio access network node may deactivate operation in multi-RAT access mode. For example, as result of improved radio condition on an RAN node and/or as a result of the decrease of load on the RAN node, this RAN node may decide to reclaim bearers on another RAT. A procedure (a sort of reverse handover procedure) may be initiated toward the secondary RAT cell thereby triggering deactivation of the multi-RAT access. Alternatively, the RAN node, as a result of its radio condition or load information or upon realization on any other criteria for deactivation of multi-RAT access as disclosed above, may send an indication to the CN to reroute traffic from the other RAT to the RAT of the initiating node thereby deactivating the multi-RAT access mode of operation. Alternatively, an RAN node (e.g., based on radio condition, load condition, or the like) may initiate handover of its bearers toward the node in another RAT that is already serving the WTRU thereby deactivating the multi-RAT access mode of operation. For example, a cell on a secondary RAT may initiate handover of the bearers of a given WTRU being served by the secondary RAT cell toward the primary RAT cell of the WTRU, thereby deactivating multi-RAT access mode of operation.

A core network node (e.g., MME, SGW, PGW, SGSN, PCRF, or the like) may trigger deactivation of multi-RAT access mode, for example in support of load balancing.

Embodiments for handover for a WTRU in a multi-RAT mode are disclosed hereafter. The handover may be LTE serving cell handover (primary cell and/or secondary cell), and/or UTRAN serving cell handover (primary cell and/or secondary cell), or any combinations thereof. In the context of multi-RAT access operation with two radio resource connections (one radio resource connection on each RAT), there are two serving cells. Each serving cell may be a primary cell or a secondary cell. The cells serving the WTRU may or may not be aware that the WTRU is operating in multi-RAT access.

The network may initiate the handover (i.e., network-controlled handover). Each serving cell may independently make handover decisions. Alternatively, the cells may coordinate or inform each other of handover decisions. Alternatively, a WTRU may initiate the handover (i.e., WTRU-controlled handover, including CELL_FACH mobility with cell update procedure). A WTRU may initiate the handover by sending a request to the serving cell or to the core network.

In the multi-RAT access operation, the handover may occur on either one of the RATs or both RATs. In a single RAT handover case, bearers on one of the RATs are handed over. In a multiple RAT handover case, a handover may be triggered for both RATs at the same time.

Priority rules may be defined in terms of handover control. For example, bearers in an LTE serving cell may be handed over to an LTE cell but not to a UTRAN cell, and bearers in a UTRAN cell may be handed over to a UTRAN cell but not to an LTE cell. Alternatively, bearers in an LTE cell may be handed over to a UTRAN cell. In this case, the current UTRAN serving cell may be prioritized over other candidate UTRAN cells. Alternatively, bearers in a UTRAN cell may be handed over to an LTE cell. In this case, the current LTE serving cell may be prioritized over other candidate LTE cells. Bearers in an LTE secondary cell may be handed over to a UTRAN cell. Bearers in a UTRAN secondary cell may be handed over to an LTE cell. Any combination of the above rules are possible.

A particular priority rules may be applied based on the operator policy setting in the network or the WTRU, or may be based on signaling between network nodes or between the network and the WTRU. The particular priority rules may be applied based on the SPID. The SPID may be extended beyond a WTRU granularity to a service level, an SDF level, a bearer level, or an APN level. These rules may be enforced or used by the WTRU during the WTRU-controlled handover (including FACH mobility), by the network during the network-controlled handover, or by both the WTRU and the network.

The criteria to enable and disable multi-RAT access may be applied as a criteria to determine whether or not to offload traffic or initiate handover and to determine specific conditions to or not to offload traffic or initiate handover. The embodiments disclosed herein may be used to determine an IP offload point (e.g., a particular LGW or PGW) and whether this offload point may be used for selective IP traffic or local IP traffic.

A partial handover may be performed. Some of the bearers on a given carrier, in a given RAT, or in a given cell (a primary cell or a secondary cell) may be handed over while other bearers on the same carrier, RAT or cell are not. For example, while a WTRU is receiving services on a first RAT that supports a CS voice service, the WTRU may handover, or setup, a bearer for a PS service on a second RAT. In support of partial handover (and a non-partial handover as well), multiple containers for transferring necessary information for handover may be used in the handover request message between the involved nodes.

For handover, a source cell may determine a suitable cell (i.e., a target cell) for the handover. In the context of multi-RAT access, suitable target cells are cells which support multi-RAT access operation. The target cell should also satisfy all other service accessibility criteria.

If the source cell cannot find any cells on the same RAT which can support multi-RAT access (based on the handover rules in place), the network may deactivate that RAT. In case there is only one RAT remaining, the network may deactivate multi-RAT access operation and continue the user path via the remaining RAT and an indication may be sent to a core network node (e.g., MME/SGW, SGSN, and/or PGW/GGSN) to route all the traffic through that RAT. For example, if no suitable UTRAN cell is found that supports multi-RAT access, the UTRAN bearers may be deactivated and the SGSN in the UTRAN may send an indication to the PGW to route all data via the LTE core network.

As a result of the handover and based on the handover control rules or policy in place, the multi-RAT access operation may no longer be in effect if all the bearers are configured on the same RAT. Such a situation may be detected by the WTRU and/or the network (e.g., the radio access network or the core network). Alternatively, the WTRU may inform the radio access network or the core network of such a situation. Alternatively, the radio access network or the core network may inform the WTRU of such an implicit transition from the multi-RAT access mode to the single RAT access mode. Alternatively, the core network may inform the radio access network, or the radio access network may inform the core network, of the transition from the multi-RAT access mode to the single RAT access mode.

In the event of transition from a multi-RAT access mode to a single-RAT access mode, the WTRU, the radio access network or the core network may start a timer. If no trigger for the multi-RAT access mode of operation occurs before the expiration of the timer, the WTRU, the radio access network, or the core network may release the resources including all the contexts associated with the operation in the multi-RAT access mode.

Multi-RAT access mode of operation may be used for paging optimization. For example, when a WTRU is operating in a multi-RAT access mode and goes to an idle mode on a given RAT, the WTRU may not listen to paging on that RAT. The WTRU may be reachable through the active RAT on which the WTRU is active (i.e., in a connected mode state). Mobile-terminated call signaling for the idle mode RAT may be addressed to the WTRU via the active RAT.

Alternatively, the WTRU may listen to paging on the idle RAT. Whether the WTRU needs to listen to paging message on an idle RAT while in a connected mode in the other RAT may be controlled by the network through configuration signaling (e.g., NAS signaling, RRC signaling including system broadcast, OTA, or USIM DM).

When the WTRU is in an idle mode on both RATs, the WTRU may listen to the paging message on either of the RATs or on both RATs. Whether the WTRU needs to listen to the paging message on either of the RATs or both RATs may be controlled by the network through configuration signaling (e.g., NAS signaling, RRC signaling including system broadcast, OTA, or USIM DM).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for multiple radio access technology (multi-RAT) access mode operation for a wireless transmit/receive unit (WTRU), the method comprising:
    measuring, by the WTRU, a condition, wherein the condition is at least one of a radio condition and a load condition;
    determining, by the WTRU, whether multi-RAT access mode should be enabled based on the measured condition and one or more related thresholds in the WTRU;
    enabling, by the WTRU, a multi-RAT access mode of operation based on the determination; and
    establishing bearers simultaneously in at least two different RATs.

2. The method of claim 1 further comprising:
    enabling access to a network that supports local IP access (LIPA), selective IP traffic offload (SIPTO), or managed remote access (MRA).

3. The method of claim 2 wherein LIPA, SIPTO, or MRA is enabled based on a subscriber profile identity.

4. The method of claim 1 further comprising:
    selecting a target cell for handover that supports the multi-RAT access mode; and
    performing a handover of at least one bearer to the target cell.

5. The method of claim 4 wherein a part of bearers of a current serving cell is handed over to the target cell.

6. The method of claim 1 wherein the determining is also based on a selected type of access point name (APN).

7. The method of claim 1 wherein the determining is also based on a proximity indication indicating proximity to a cell supporting the multi-RAT access mode of operation.

8. The method of claim 7 wherein the proximity indication is included in a tracking area update message, a routing area update message, an attach request message, or a packet data network (PDN) connectivity request message.

9. A wireless transmit/receive unit (WTRU) for multiple radio access technology (multi-RAT) access mode operation, the WTRU comprising:
    a transceiver operatively coupled to a processor, the transceiver and the processor configured to measure a condition, determine whether multi-RAT access mode should be enabled based on the measured condition and one or more related thresholds in the WTRU, enable a multi-RAT access mode of operation based on the determination, and establish bearers in at least two different RATs,
    wherein the condition is at least one of a radio condition and a load condition.

10. The WTRU of claim 9 wherein the transceiver and the processor are configured to enable access to a network that supports local IP access (LIPA), selective IP traffic offload (SIPTO), or managed remote access (MRA).

11. The WTRU of claim 10 wherein LIPA, SIPTO, or MRA is enabled based on a subscriber profile identity.

12. The WTRU of claim 9 wherein the transceiver and the processor are configured to select a target cell for handover that supports the multi-RAT access mode, and perform a handover of at least one bearer to the target cell.

13. The WTRU of claim 12 wherein a part of bearers of a current serving cell is handed over to the target cell.

14. The WTRU of claim 9 wherein the determining is also based on a selected type of access point name (APN).

15. The WTRU of claim 9 wherein the determining is also based on a proximity indication indicating proximity to a cell supporting the multi-RAT access mode of operation.

16. The WTRU of claim 15 wherein the proximity indication is included in a tracking area update message, a routing area update message, an attach request message, or a packet data network (PDN) connectivity request message.

* * * * *